(12) United States Patent
Tanaka et al.

(10) Patent No.: US 9,576,161 B2
(45) Date of Patent: Feb. 21, 2017

(54) CARD READER AND CONTROL METHOD THEREFOR

(71) Applicant: NIDEC SANKYO CORPORATION, Suwa-gun, Nagano (JP)

(72) Inventors: Jo Tanaka, Nagano (JP); Shinya Miyazawa, Nagano (JP); Akihiro Negishi, Nagano (JP); Yohei Shimizu, Nagano (JP); Kazuto Saeki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 14/781,413

(22) PCT Filed: Jul. 24, 2014

(86) PCT No.: PCT/JP2014/069561
§ 371 (c)(1),
(2) Date: Sep. 30, 2015

(87) PCT Pub. No.: WO2015/016130
PCT Pub. Date: Feb. 5, 2015

(65) Prior Publication Data
US 2016/0140366 A1    May 19, 2016

(30) Foreign Application Priority Data

Jul. 31, 2013  (JP) ................................. 2013-159210
Mar. 27, 2014  (JP) ................................. 2014-065086
Mar. 27, 2014  (JP) ................................. 2014-065087

(51) Int. Cl.
*G06K 7/08*    (2006.01)
*G06K 7/00*    (2006.01)

(52) U.S. Cl.
CPC ............. *G06K 7/087* (2013.01); *G06K 7/0021* (2013.01); *G06K 7/0069* (2013.01)

(58) Field of Classification Search
CPC .................................................. G06K 7/0004
(Continued)

(56) References Cited

U.S. PATENT DOCUMENTS 4,675,516 A * 6/1987 Guion .................. G06K 7/0069
235/441
5,036,184 A    7/1991 Sasaki

FOREIGN PATENT DOCUMENTS

JP   H0219987 A    1/1990
JP   H09128872 A   5/1997
(Continued)

OTHER PUBLICATIONS

International Search Report corresponding to Application No. PCT/JP2014/069561; Date of Mailing: Sep. 30, 2014, with English translation.

*Primary Examiner* — Jamara Franklin
(74) *Attorney, Agent, or Firm* — Cantor Colburn LLP

(57) ABSTRACT

A card reader for use with a card incorporated with an IC chip may include an insertion port into which the card is inserted; a metal detection mechanism structured to detect an external connection terminal of the IC chip provided in the card; and a tip end detection mechanism structured to detect a tip end in an inserting direction of the card inserted into the insertion port. The metal detection mechanism and the tip end detection mechanism may be disposed so that, when the tip end detection mechanism detects the tip end in the inserting direction of the card inserted into the insertion port in a correct posture, the metal detection mechanism detects the external connection terminal.

21 Claims, 16 Drawing Sheets

(58) Field of Classification Search
USPC .......................................... 235/435, 441, 451
See application file for complete search history.

(56) References Cited

FOREIGN PATENT DOCUMENTS

| | | |
|---|---|---|
| JP | 2003337922 A | 11/2003 |
| JP | 2005070870 A | 3/2005 |
| JP | 2007108980 A | 4/2007 |
| JP | 2010009617 A | 1/2010 |
| JP | 2013164675 A | 8/2013 |

\* cited by examiner

CARD READER AND CONTROL METHOD THEREFOR

CROSS REFERENCE TO RELATED APPLICATIONS

This is the U.S. national stage of application No. PCT/JP2014/069561, filed on Jul. 24, 2014. Priority under 35 U.S.C. §119(a) and 35 U.S.C. §365(B) is claimed from Japanese Applications Nos. 2013-159210, filed Jul. 31, 2013; 2014-065086, filed Mar. 27, 2014; and 2014-065087, filed Mar. 27, 2014; the disclosures of which are incorporated herein by reference.

TECHNICAL FIELD

The present invention relates to a card reader structured to process a contact type IC card which is incorporated with an IC chip. Further, the present invention relates to a control method for a card reader structured to process a contact type IC card.

BACKGROUND ART

Conventionally, an IC card reader structured to process a contact type IC card which is incorporated with an IC chip has been known (see, for example, Patent Literature 1). The IC card reader described in Patent Literature 1 includes a width sensor for detecting a width of an object inserted into an insertion port, and a magnetic body sensor for detecting whether a magnetic body has been inserted into the insertion port or not. The width sensor is disposed on one end side of a card passage in a widthwise direction of a card inserted into the insertion port. The magnetic body sensor is disposed at a position where an external connection terminal of an IC card inserted in a correct posture into the insertion port (in other words, an IC card inserted into the insertion port in a direction where appropriate processing of the IC card can be performed in the IC card reader) is passed. Further, the card reader includes a shutter for opening and closing the card passage. The shutter is disposed on a rear side relative to the width sensor and the magnetic body sensor in the IC card reader.

In the IC card reader described in Patent Literature 1, it is determined whether an IC card has been inserted into the insertion port or not based on a detected result of the width sensor and a detected result of the magnetic body sensor. Further, in the IC card reader, when it is determined that an IC card has been inserted into the insertion port, the shutter is opened and the IC card is taken into an inside of the IC card reader.

A card reader described in Patent Literature 2 has been also known. A card used in the card reader described in Patent Literature 2 is formed with an external connection terminal of an IC chip. Further, the card reader described in Patent Literature 2 includes a card insertion part which is formed with an insertion port into which a card is inserted. The card insertion part includes a metal sensor for detecting an external connection terminal of a card and a shutter for closing a card passage where the card is to be passed. The metal sensor includes a core and an excitation coil and a sensing coil which are wound around the core. The metal sensor is disposed at a position where an external connection terminal of a card inserted in a correct posture into the insertion port (in other words, a card inserted into the insertion port in a direction where appropriate processing of the card can be performed in an inside of the card reader) is passed. A shutter is disposed on a rear side relative to the metal sensor in an inserting direction of a card.

In the card reader described in Patent Literature 2, it can be detected whether a card formed with an external connection terminal has been inserted into the insertion port or not (in other words, whether an IC card has been inserted into the insertion port or not) based on a detected result of the metal sensor. Further, in the card reader, the shutter closes a card passage in a standby state before a card is inserted into the insertion port. When it is detected that a card formed with an external connection terminal has been inserted into the insertion port based on a detected result of the metal sensor, the shutter is opened and the card is taken into the inside of the card reader.

A shape of an IC card into which an IC chip is incorporated is specified in the international standard and an IC card in conformity with the international standard is formed in a substantially rectangular shape whose four corners are rounded. The card reader described in Patent Literature 2 takes a card (IC card) formed in a substantially rectangular shape in its longitudinal direction into the inside and performs processing for the card. Further, conventionally, a card reader has been known in which a card (IC card) formed in a substantially rectangular shape is taken into in its short widthwise direction and processing is performed for the card (see, for example, Patent Literature 3). The card reader described in Patent Literature 3 includes a card insertion part which is formed with an insertion port into which a card is inserted. The card insertion part includes a shutter for closing a card passage where a card is to be passed.

In a contact type IC card in conformity with the international standard, as shown in FIG. 14A, an external connection terminal $2c$ of an IC chip is formed on a front face $2a$ of a card 2. Further, the external connection terminal $2c$ is formed at a predetermined position with one end face $2d$ of the card 2 in a short widthwise direction of the card 2 and one end face $2e$ of the card 2 in a longitudinal direction of the card 2 as references. A distance "L1" between the one end face $2d$ and the external connection terminal $2c$ in the short widthwise direction of a card 2 is different from a distance "L2" between the other end face $2f$ and the external connection terminal $2c$ in the short widthwise direction of the card 2. Specifically, the distance "L1" is shorter than the distance "L2". Further, a distance "L3" between the one end face $2e$ in a longitudinal direction of the card 2 and the external connection terminal $2c$ is different from a distance "L4" between the other end face $2g$ and the external connection terminal $2c$ in the longitudinal direction of the card 2. Specifically, the distance "L3" is considerably shorter than the distance "L4". Therefore, a length between the distance "L1" and the distance "L2" is a length of the external connection terminal $2c$ in a short widthwise direction of a card 2, and a length between the distance "L3" and the distance "L4" is a length of the external connection terminal $2c$ in a longitudinal direction of the card 2.

CITATION LIST

Patent Literature

[PTL 1] Japanese Patent Laid-Open No. 2010-9617
[PTL 2] Japanese Patent Laid-Open No. 2003-337922
[PTL 3] Japanese Patent Laid-Open No. 2013-164675

SUMMARY OF THE INVENTION

Technical Problem

In the IC card reader described in Patent Literature 1, in a case that a card 2 is inserted into the insertion port in a correct posture, the card 2 is normally inserted from the one end 2e (in other words, in a direction shown by the arrow in FIG. 14(A)) in a state that the front face 2a is directed upward. As described above, in the IC card reader described in Patent Literature 1, the magnetic body sensor is disposed at a position where an external connection terminal 2c of an IC card inserted into the insertion port in a correct posture is passed. Therefore, in the IC card reader described in Patent Literature 1, for example, when a card 2 is inserted from the one end 2e side in a state that the rear face 2b is directed upward (in other words, in a direction shown by the arrow in FIG. 14(B), the external connection terminal 2c of the card 2 is passed at a position displaced from a position where the magnetic body sensor is disposed. Therefore, in the IC card reader, even when a card 2 is inserted in a direction shown by the arrow in FIG. 14(B), it can be detected that a posture of the inserted card 2 is not correct based on a detected result by the magnetic body sensor.

On the other hand, in the IC card reader described in Patent Literature 1, when a card 2 is inserted from the other end 2g side in a state that the rear face 2b is directed upward (in other words, in a direction shown by the arrow in FIG. 14(C)), the external connection terminal 2c of the card 2 may be passed through the position where the magnetic body sensor is disposed. However, the IC card reader described in Patent Literature 1 includes a shutter and the distance "L4" largely differs from the distance "L3" and thus, even when a card 2 is inserted in a direction shown by the arrow in FIG. 14(C), the other end 2g is abutted with the shutter before the external connection terminal 2c of the card 2 is passed through the position where the magnetic body sensor is disposed. Therefore, in the IC card reader, even when a card 2 is inserted in a direction shown by the arrow in FIG. 14(C), it can be detected that a posture of an inserted card 2 is not correct based on a detected result of the magnetic body sensor. However, in the IC card reader, if the shutter is not provided, it is difficult to detect that a posture of the inserted card 2 is not correct when a card 2 is inserted in a direction shown by the arrow in FIG. 14(C).

Further, when the metal sensor provided in the card reader described in Patent Literature 2 is provided in the card reader described in Patent Literature 3, also in the card reader described in Patent Literature 3, it can be detected whether a card formed with an external connection terminal has been inserted into the insertion port or not (in other words, whether an IC card has been inserted into the insertion port or not) based on a detected result of the metal sensor. Specifically, in the card reader described in Patent Literature 3, when a metal sensor is disposed at a position where an external connection terminal 2c of a card inserted into the insertion port in a correct posture (in other words, a card inserted into the insertion port in a direction where appropriate processing for a card can be performed in an inside of the card reader) is passed, even in the card reader described in Patent Literature 3, it can be detected whether a card formed with an external connection terminal 2c has been inserted into the insertion port or not based on a detected result of the metal sensor.

On the other hand, like a card reader described in Patent Literature 3, in a card reader in which a card formed in a substantially rectangular shape is taken in its short widthwise direction and is processed, when a card is to be inserted into the insertion port in a correct posture, a card 2 is, for example, as shown in FIG. 15(A), inserted from the one end face 2d side in a state that its front face 2a is directed upward (in other words, in a direction shown by the arrow in FIG. 15(A)). Further, in order to detect whether a card formed with an external connection terminal 2c has been inserted into the insertion port or not, in the card reader described in Patent Literature 3, a metal sensor is disposed at a position where an external connection terminal 2c of a card inserted into the insertion port in a correct posture is passed. Therefore, in the card reader, even when a card 2 is inserted from the other end face 2f side in a state that its rear face 2b is directed upward (in other words, in a direction shown by the arrow in FIG. 15(B)), the external connection terminal of the card 2 is passed through the position where the metal sensor is disposed.

Further, as described with reference to FIG. 14(A), the distance "L1" does not differ from the distance "L2" largely. Therefore, in the card reader described in Patent Literature 3, even in a case that a shutter is provided, an external connection terminal 2c of a card 2 may be detected by a metal sensor when the other end face 2f of the card 2 inserted in a direction shown by the arrow in FIG. 15(B) is abutted with the shutter. Accordingly, in a case that a metal sensor is provided in the card reader described in Patent Literature 3, sensibility of the metal sensor is required to be lowered so that, when a card 2 has been inserted from the other end face 2f side in a state that its rear face 2b is directed upward, the metal sensor does not detect the external connection terminal 2c of the card 2 and detects only a card 2 inserted in a correct direction.

An arrangement range of an external connection terminal 2c formed in an IC card 2 is specified in the international standard "ISO/IEC7816-2". Specifically, in the international standard "ISO/IEC7816-2", arrangement ranges of a first connection terminal 2p, a second connection terminal 2q, a third connection terminal 2r, a fourth connection terminal 2s, a fifth connection terminal 2t, a sixth connection terminal 2u, a seventh connection terminal 2v and an eighth connection terminal 2w which are formed as the external connection terminal 2c on the front face 2a of a card 2 are specified as shown in FIG. 16(B). The arrangement ranges of the first through the eighth connection terminals 2p through 2w are specified to be the dimensions shown in FIG. 16(B) with the one end face 2e in a longitudinal direction of a card 2 and the one end face 2d in a short widthwise direction of the card 2 as references. The unit of the dimension shown in FIG. 16(B) is "mm" (millimeter) and, when the first through the eighth connection terminals 2p through 2w are formed at the dimension values in the drawing, the sizes of the first through the eighth connection terminals 2p through 2w become the smallest. A card 2 may be used which is formed with no fourth connection terminal 2s and no eighth connection terminal 2w.

In a case that a card formed in a substantially rectangular shape is taken in its longitudinal direction and processed like the card reader described in Patent Literature 2, even when the sizes of the first through the eighth connection terminals 2p through 2w are the smallest, respective distances between the first through the fourth connection terminals 2p through 2s are narrow in a short widthwise direction of the card 2 and, similarly, respective distances between the fifth through the eighth connection terminals 2t through 2w are also narrow and thus, even when attaching accuracy of a metal sensor in a short widthwise direction of a card 2 is relatively low, the first through the eighth connection terminals 2p through 2w can be detected by the metal sensor. Therefore, in the card reader described in Patent Literature 2, even when attaching accuracy of the metal sensor is relatively low, it can be detected whether a card formed with an external connection terminal has been inserted into an insertion port or not based on a detected result of the metal sensor.

On the other hand, in a case that a card formed in a substantially rectangular shape is taken in its short widthwise direction and processed like the card reader described in Patent Literature 3, when the sizes of the first through the eighth connection terminals 2p through 2w are the smallest, distances in a longitudinal direction of the card 2 between the first through the fourth connection terminals 2p through 2s and the fifth through the eighth connection terminals 2t through 2w are wide and thus, when attaching accuracy of the metal sensor in the longitudinal direction of the card 2 is low, it may be difficult that the first through the eighth connection terminals 2p through 2w are detected by the metal sensor. For example, when attaching accuracy of the metal sensor is low and an axial center of a core of the metal sensor is disposed between the first through the fourth connection terminals 2p through 2s and the fifth through the eighth connection terminals 2t through 2w in a longitudinal direction of the card 2, it may be difficult that the first through the eighth connection terminals 2p through 2w are detected by the metal sensor. As a result, there is a possibility that it is unable to detect whether a card formed with an external connection terminal has been inserted into an insertion port or not based on a detected result of the metal sensor.

Further, as described above, in a card reader in which a card formed in a substantially rectangular shape is taken in its short widthwise direction and processed, sensibility of the metal sensor is required to be lowered so that, when a card 2 has been inserted from the other end face 2f side in a state that its rear face 2b is directed upward, the metal sensor does not detect the first through the eighth connection terminals 2p through 2w of the card 2, and thereby it can be detected whether the card 2 has been inserted in a correct direction or not. Therefore, in a case that the sizes of the first through the eighth connection terminals 2p through 2w are the smallest, when attaching accuracy of the metal sensor in a longitudinal direction of the card 2 is low, a possibility incapable of detecting whether a card formed with an external connection terminal has been inserted into the insertion port or not based on a detected result of the metal sensor may be further increased.

Further, the distance "L1" does not differ from the distance "L2" largely as described above and thus, in the card reader described in Patent Literature 3, even in a case that a shutter is provided, when the other end face 2f of a card 2 inserted in a direction shown by the arrow in FIG. 15(B) is butted with the shutter, the external connection terminal 2c of the card 2 may be detected by the metal sensor. Therefore, in the card reader, when a card 2 is inserted in a direction shown by the arrow in FIG. 15(B), there is a possibility that it is unable to determine whether the card 2 has been inserted in a correct posture or not based on a detected result of the metal sensor.

When a case that a card 2 is inserted in a state that its front face 2a is directed upward and a case that a card 2 is inserted in a state that its rear face 2b is directed upward are compared with each other, signal levels of output signals of the metal sensor when the external connection terminal 2c is detected by the metal sensor are different from each other. For example, a signal level of an output signal of the metal sensor when an external connection terminal 2c is detected by the metal sensor in a case that a card 2 is inserted in a state that its front face 2a is directed upward is higher than a signal level of an output signal of the metal sensor when an external connection terminal 2c is detected by the metal sensor in a case that a card 2 is inserted in a state that its rear face 2b is directed upward. Therefore, when a threshold value is appropriately set for an output signal of the metal sensor, even in a case that an external connection terminal 2c of a card 2 inserted in a state that its rear face 2b is directed upward is detected by the metal sensor, it can be determined whether the card 2 has been inserted in a correct posture or not based on a detected result of the metal sensor.

However, according to considerations and examinations of the present inventors, the present inventors have found that there are some cards (hereinafter, referred to as a "low reactive card") on the market whose signal level of an output signal of the metal sensor when an external connection terminal 2c is detected by the metal sensor is lower than that of a card commonly available on the market even in a case that the card 2 is inserted in a state that its front face 2a is directed upward. Further, the present inventors have examined and found that, since low reactive cards have been available on the market, it is difficult to appropriately set a threshold value for an output signal of the metal sensor and thus, there is a possibility that it is unable to determine whether a card 2 has been inserted in a correct posture or not based on a detected result of the metal sensor.

In view of the problem described above, at least an embodiment of the present invention provides a card reader in which an IC card in a substantially rectangular shape in conformity with the international standard or JIS standard is taken in its longitudinal direction and is processed, the card reader being capable of easily determining whether a posture of an inserted IC card is correct or not even when a shutter member for opening and closing a card passage where the IC card is passed is not provided. Further, at least an embodiment of the present invention provides a card reader in which an IC card in a substantially rectangular shape in conformity with the international standard or JIS standard is taken in its short widthwise direction and is processed, the card reader being capable of easily determining whether a posture of an inserted IC card is correct or not.

Further, in view of the problem described above, at least an embodiment of the present invention provides a card reader in which an IC card in a substantially rectangular shape in conformity with the international standard is taken in its short widthwise direction and is processed, the card reader being capable of appropriately detecting whether a card formed with an external connection terminal has been inserted into an insertion port or not based on a detected result of a metal detection mechanism in a case that the size of the external connection terminal is the smallest and, even when the sensibility of the metal detection mechanism is lowered.

In addition, in view of the problem described above, at least an embodiment of the present invention provides a card reader in which an IC card in a substantially rectangular shape in conformity with the international standard is taken in its short widthwise direction and is processed, the card reader being capable of appropriately determining whether a card has been inserted into an insertion port in a correct posture or not. Further, at least an embodiment of the present invention provides a control method for a card reader in which an IC card in a substantially rectangular shape in conformity with the international standard is taken in its short widthwise direction and is processed, the control method being capable of appropriately determining whether a card has been inserted into an insertion port in a correct posture or not.

Solution to Problem

To achieve the above, at least an embodiment of the present invention provides a card reader including an insertion port into which a card incorporated with an IC chip is inserted, a metal detection mechanism structured to detect an external connection terminal of the IC chip provided in the card, and a tip end detection mechanism structured to detect a tip end in an inserting direction of the card inserted into the insertion port. The metal detection mechanism and the tip end detection mechanism are disposed so that, when the tip end detection mechanism detects the tip end in the inserting direction of the card inserted into the insertion port in a correct posture, the metal detection mechanism detects the external connection terminal.

In at least an embodiment of the present invention, the card reader includes, for example, a control section into which an output signal of the metal detection mechanism and an output signal of the tip end detection mechanism are inputted, and the control section determines whether the card has been inserted into the insertion port in a correct posture or not based on the output signal of the metal detection mechanism when the tip end detection mechanism detects the tip end of the card in the inserting direction.

In the card reader in accordance with at least an embodiment of the present invention, the metal detection mechanism structured to detect an external connection terminal and the tip end detection mechanism structured to detect a tip end of the card in an inserting direction are disposed at positions so that, when the tip end detection mechanism detects the tip end in the inserting direction of the card inserted in a correct posture, the metal detection mechanism detects the external connection terminal. Therefore, according to at least an embodiment of the present invention, in a case that the card reader is a card reader in which a substantially rectangular-shaped IC card in conformity with the international standard or JIS standard is taken into in its longitudinal direction and processed, even when a shutter member for opening and closing a card passage where the card is passed is not provided, it can be easily determined whether a posture of the inserted card is correct or not based on an output signal of the metal detection mechanism when the tip end detection mechanism detects a tip end of the card in the inserting direction. Further, according to at least an embodiment of the present invention, in a case that the card reader is a card reader in which a substantially rectangular-shaped IC card in conformity with the international standard or JIS standard is taken into in its short widthwise direction and processed, it can be easily determined whether a posture of the inserted card is correct or not based on an output signal of the metal detection mechanism when the tip end detection mechanism detects a tip end of the card in the inserting direction.

In the card reader in accordance with at least an embodiment of the present invention, for example, a card formed in a substantially rectangular shape is taken into in a short widthwise direction of the card and is processed. In this case, it is preferable that the card reader includes a width detection mechanism structured to detect both end parts of a card in a width direction which is perpendicular to a thickness direction and the inserting direction of the card inserted into the insertion port. According to this structure, it can be easily determined by using the width detection mechanism whether a card is inserted in its short widthwise direction or inserted in its longitudinal direction. Further, according to this structure, it can be detected by using the width detection mechanism whether a foreign matter is inserted into the insertion port or a card is inserted.

Further, in this case, the card reader includes a control section into which an output signal of the metal detection mechanism, an output signal of the tip end detection mechanism and an output signal of the width detection mechanism are inputted. The width detection mechanism is disposed on an insertion port side relative to the tip end detection mechanism, and the control section determines whether the card has been inserted into the insertion port in a correct posture or not based on a difference between a signal level of an output signal of the metal detection mechanism when the width detection mechanism detects both end parts of the card and a signal level of an output signal of the metal detection mechanism when the tip end detection mechanism detects a tip end of the card in the inserting direction. According to this structure, even when a signal level of an output signal of the metal detection mechanism is varied due to an external factor such as variation of ambient temperature of the card reader, it can be determined whether a card has been inserted in a correct posture or not in a state that the influence of the variation is restrained. Therefore, it can be determined whether a card has been inserted in a correct posture or not with a high degree of accuracy.

In at least an embodiment of the present invention, it is preferable that the card reader includes a card passage where the card inserted into the insertion port is passed and a shutter member structured to open and close the card passage, and the shutter member is disposed on a rear side of the card reader relative to the tip end detection mechanism. According to this structure, a card inserted in its longitudinal direction can be prevented from being entered to a rear side of the card reader by the shutter member. Further, according to this structure, a foreign matter inserted into the insertion port can be prevented from being entered to a rear side of the card reader by the shutter member.

In at least an embodiment of the present invention, for example, the metal detection mechanism is a magnetic type sensor, which includes an excitation coil, a detection coil, and a core which is formed of magnetic material and around which the excitation coil and the detection coil are wound, and the tip end detection mechanism is an optical type sensor which includes a light emitting element and a light receiving element structured to receive light from the light emitting element. In this case, it is preferable that a distance in the inserting direction between the magnetic type sensor and the optical type sensor is longer than a distance between the tip end of the card inserted in a correct posture and the external connection terminal and is shorter than a length which is a total sum of the distance between the tip end of the card and the external connection terminal and a length of the external connection terminal in a short widthwise direction of the card.

Next, in order to achieve the above, at least an embodiment of the present invention provides a card reader for use with a card which is incorporated with an IC chip and formed in a substantially rectangular shape, the card being taken into in its short widthwise direction to be performed with data communication. The card reader includes a card insertion part which is formed with an insertion port into which the card is inserted, a metal detection mechanism which is provided in the card insertion part and is structured to detect an external connection terminal of the IC chip formed on a front face of the card, and a card passage which is formed in the card insertion part for passing the card. The metal detection mechanism is a magnetic type sensor which includes a core made of magnetic material and an excitation coil and a detection coil which are wound around the core with an axial center of the core as a winding center. In a case that a direction perpendicular to a thickness direction and an inserting direction of the card inserted into the insertion port is referred to as a first direction, one end face of the card in a longitudinal direction of the card is referred to as a first card reference end face, and one end face of the card in a short widthwise direction of the card is referred to as a second card reference end face, one end of the card passage in the first direction is formed to be a reference surface where the first card reference end face is contacted when a normal card is inserted into the insertion port in a correct posture without inclination, and a distance in the first direction between the reference surface and the axial center of the core is set to be 10.25 mm or more and 12.25 mm or less, or set to be 17.87 mm or more and 19.87 mm or less.

In the card reader in accordance with at least an embodiment of the present invention, the metal detection mechanism is a magnetic type sensor which includes a core and an excitation coil and a detection coil wound around the core with an axial center of the core as a winding center, and one end of the card passage in the first direction is formed to be a reference surface where the first card reference end face is contacted when a normal card is inserted into the insertion port in a correct posture without inclination. Further, in at least an embodiment of the present invention, a distance in the first direction between the reference surface and the axial center of the core is set to be 10.25 mm or more and 12.25 mm or less, or set to be 17.87 mm or more and 19.87 mm or less. Therefore, according to at least an embodiment of the present invention, in a case that a card which is specified in the international standard "ISO/IEC7816-2" is inserted into the insertion port in a correct posture, an external connection terminal of the card is capable of passing an extended line of the axial center of the core. Specifically, with reference to FIG. 16(B), in a case that a card 2 specified in the international standard "ISO/IEC7816-2" is inserted into an insertion port in a correct posture, the first through the fourth connection terminals $2p$ through $2s$ or the fifth through the eighth connection terminals $2t$ through $2w$ are capable of passing the extended line of the axial center of the core. Therefore, in at least an embodiment of the present invention, in a case that the sizes of the first through the eighth connection terminals $2p$ through $2w$ are the smallest, even when sensibility of the metal detection mechanism is lowered, the first through the fourth connection terminals $2p$ through $2s$ or the fifth through the eighth connection terminals $2t$ through $2w$ can be detected appropriately by the metal detection mechanism. As a result, according to at least an embodiment of the present invention, in a case that the size of an external connection terminal is the smallest, even when sensibility of the metal detection mechanism is lowered, it can be appropriately detected whether a card formed with an external connection terminal is inserted into the insertion port or not based on a detected result of the metal detection mechanism. In this case, it is preferable that a distance between the tip end detection mechanism and the metal detection mechanism is set in a range which is longer than a distance ("L1" in FIG. 14(A)) between a tip end of the card inserted in a correct posture and the external connection terminal and is shorter than a total length of the distance "L1" and a length in the short widthwise direction of the external connection terminal $2c$.

In at least an embodiment of the present invention, it is preferable that a width of the insertion port in the first direction is wider than a width in the longitudinal direction of the card, the card insertion part includes a tip end detection mechanism structured to detect a tip end in the inserting direction of the card inserted into the insertion port, the tip end detection mechanism is disposed on a rear side relative to the metal detection mechanism in the inserting direction and, in a case that a normal card is inserted into the insertion port in a correct posture, the external connection terminal is detected by the metal detection mechanism before the second card reference end face disposed on a rear side in the inserting direction is detected by the tip end detection mechanism, and a distance between the reference surface and the axial center of the core in the first direction is set to be 17.87 mm or more and 19.87 mm or less.

According to this structure, a width of the insertion port in the first direction is set to be wider than a width in the longitudinal direction of the card and thus a card is easily inserted into the insertion port. On the other hand, according to this structure, a width of the insertion port in the first direction is set to be wider than a width in the longitudinal direction of a card and thus the card inserted into the insertion port is easily inclined. In a case that a card is inclined so that the first card reference end face side of a card inserted in a correct posture is located on a front side in the inserting direction of the card and that a distance between the reference surface and the axial center of the core in the first direction is set to be 17.87 mm or more and 19.87 mm or less, in comparison with a case that a distance between the reference surface and the axial center of the core in the first direction is set to be 10.25 mm or more and 12.25 mm or less, it can be detected whether the card formed with the external connection terminal has been inserted into the insertion port or not by the metal detection mechanism at an earlier timing before an end face on a rear side of the card (tip end of the card) in the inserting direction of the card is detected by the tip end detection mechanism. Therefore, predetermined processing in the card reader can be performed speedily after a rear end face of a card is detected by the tip end detection mechanism.

In at least an embodiment of the present invention, it is preferable that the card is formed with a first connection terminal, a second connection terminal, a third connect terminal, a fifth connect terminal, a sixth connect terminal and a seventh connect terminal as the external connection terminal, the first connection terminal, the second connection terminal and the third connect terminal are disposed from the second card reference end face in this order in the short widthwise direction of the card and are disposed at the same positions as each other in the longitudinal direction of the card, the fifth connection terminal is disposed at the same position as the first connection terminal in the short widthwise direction of the card, the sixth connection terminal is disposed at the same position as the second connection terminal in the short widthwise direction of the card, the seventh connection terminal is disposed at the same position as the third connection terminal in the short widthwise direction of the card, the fifth connection terminal, the sixth connection terminal and the seventh connect terminal are disposed at the same position as each other in the longitudinal direction of the card and are disposed at separated positions from the first card reference end face relative to the first connection terminal, the second connection terminal and the third connect terminal and, in a case that a normal card is inserted into the insertion port in a correct posture without inclination, when the second card reference end face is detected by the tip end detection mechanism, the axial center of the core and the sixth connection terminal are overlapped with each other in the thickness direction of the card.

According to this structure, in a case that a normal card is inserted into the insertion port in a correct posture without inclination, in comparison with a case that the axial center of the core and the fifth connection terminal are overlapped with each other in a thickness direction of the card when the second card reference end face (tip end of the card) is detected by the tip end detection mechanism, it can be detected whether the card formed with the external connection terminal has been inserted into the insertion port or not by the metal detection mechanism at an earlier timing before a rear end face of the card (tip end of the card) is detected by the tip end detection mechanism. Therefore, predetermined processing in the card reader can be performed speedily after a rear end face of a card is detected by the tip end detection mechanism. Further, according to this structure, in a case that a normal card is inserted into the insertion port in a correct posture without inclination, in comparison with a case that the axial center of the core and the seventh connection terminal are overlapped with each other in a thickness direction of the card when the second card reference end face is detected by the tip end detection mechanism, a distance in the inserting direction of the card between the eighth connection terminal $2w$ and the axial center of the core when the card 2 is inserted in the direction shown by the arrow in FIG. 15(B) and the other end face $2f$ of the card 2 is detected by the tip end detection mechanism can be made longer. Therefore, in a case that a card 2 is inserted in a direction shown by the arrow in FIG. 15(B) and, when the other end face $2f$ is detected by the tip end detection mechanism, its external connection terminal can be surely prevented from being detected by the metal detection mechanism. As a result, it can be further appropriately detected whether a card is inserted in a correct posture or not.

In addition, in order to achieve the above, at least an embodiment of the present invention provides a card reader for use with a card which is incorporated with an IC chip and formed in a substantially rectangular shape, the card being taken into in its short widthwise direction to be performed with data communication. The card reader includes a card insertion part which is formed with an insertion port into which the card is inserted, and a control section structured to control the card reader. The card insertion part includes a metal detection mechanism structured to detect an external connection terminal of the IC chip formed on a front face of the card, and a tip end detection mechanism structured to detect a tip end of the card in an inserting direction of the card inserted into the insertion port. The metal detection mechanism is disposed at a position where the external connection terminal of the normal card inserted in a correct posture is passed in a card width direction perpendicular to a thickness direction and the inserting direction of the card inserted into the insertion port. The metal detection mechanism and the tip end detection mechanism are connected with the control section and are disposed so that, when the normal card is inserted into the insertion port in a correct posture, the metal detection mechanism detects the external connection terminal before the tip end detection mechanism detects the tip end of the card. In the normal card, a distance between one end face of the card in the short widthwise direction of the card and one end of the external connection terminal in the short widthwise direction of the card is shorter than a distance between the other end face of the card in the short widthwise direction of the card and the other end of the external connection terminal in the short widthwise direction of the card. The control section acquires a metal detection signal value based on an output signal of the metal detection mechanism at a predetermined cycle over at least a part of a time period until the tip end of the card is detected by the tip end detection mechanism and calculates an integrated value by integrating at least a part of a plurality of acquired metal detection signal values, and thereby the control section determines whether the normal card has been inserted into the insertion port in a correct posture or not based on the integrated value.

Further, in order to achieve the above, at least an embodiment of the present invention provides a control method for a card reader for use with a card which is incorporated with an IC chip and formed in a substantially rectangular shape. The card reader includes a card insertion part formed with an insertion port into which the card is inserted in its short widthwise direction, and the card insertion part includes a metal detection mechanism structured to detect an external connection terminal of the IC chip formed on a front face of the card, and a tip end detection mechanism structured to detect a tip end of the card in an inserting direction of the card inserted into the insertion port. The metal detection mechanism is disposed at a position where the external connection terminal of the normal card inserted in a correct posture is passed in a card width direction perpendicular to a thickness direction and the inserting direction of the card inserted into the insertion port. The metal detection mechanism and the tip end detection mechanism are disposed so that, when the normal card is inserted into the insertion port in a correct posture, the metal detection mechanism detects the external connection terminal before the tip end detection mechanism detects the tip end of the card. In the normal card, a distance between one end face of the card in the short widthwise direction of the card and one end of the external connection terminal in the short widthwise direction of the card is shorter than a distance between the other end face of the card in the short widthwise direction of the card and the other end of the external connection terminal in the short widthwise direction of the card. In the card reader, the control method includes acquiring a metal detection signal value based on an output signal of the metal detection mechanism at a predetermined cycle over at least a part of a time period until the tip end of the card is detected by the tip end detection mechanism, calculating an integrated value by integrating at least a part of a plurality of acquired metal detection signal values, and determining whether the normal card has been inserted into the insertion port in a correct posture or not based on the integrated value.

In at least an embodiment of the present invention, a metal detection signal value based on an output signal of the metal detection mechanism is acquired at a predetermined cycle over at least a part of a time period until the tip end of the card is detected by the tip end detection mechanism and an integrated value is calculated by integrating at least a part of a plurality of acquired metal detection signal values. As described above, in a case that a card is inserted in a state that its front face is directed upward, a signal level of an output signal of the metal detection mechanism when an external connection terminal is detected by the metal detection mechanism is different from that in a case that the card is inserted in a state that its rear face is directed upward. Therefore, according to at least an embodiment of the present invention, a difference can be increased between an integrated value calculated by integrating at least a part of a plurality of metal detection signal values acquired at a predetermined cycle in a case that a card is inserted in a state that its front face is directed upward and an integrated value calculated by integrating at least a part of a plurality of metal detection signal values acquired at a predetermined cycle in a case that the card is inserted in a state that its rear face is directed upward. Accordingly, in at least an embodiment of the present invention, it can be appropriately determined whether a card has been inserted into the insertion port in a correct posture or not based on the integrated value.

Further, in a normal card in conformity with the international standard, a distance between one end face of the card in a short widthwise direction of the card and one end of the external connection terminal in the short widthwise direction of the card is shorter than a distance between the other end face of the card in the short widthwise direction of the card and the other end of the external connection terminal in the short widthwise direction of the card. Further, in at least an embodiment of the present invention, a metal detection signal value based on an output signal of the metal detection mechanism is acquired at a predetermined cycle over at least a part of a time period until the tip end of the card is detected by the tip end detection mechanism and an integrated value is calculated by integrating at least a part of a plurality of acquired metal detection signal values. Therefore, according to at least an embodiment of the present invention, even when a difference between a signal level of an output signal of the metal detection mechanism when an external connection terminal of a low reactive card inserted in a correct posture is detected by the metal detection mechanism and a signal level of an output signal of the metal detection mechanism when an external connection terminal of a card commonly available on the market which is inserted in a state that its rear face is directed upward is detected by the metal detection mechanism is small, a difference can be made clear between the integrated value in a case that a low reactive card is inserted in a correct posture and the integrated value in a case that a card commonly available on the market is inserted in a state that its rear face is directed upward. Accordingly, in at least an embodiment of the present invention, even when a low reactive card is inserted into the insertion port, it can be appropriately determined whether a card has been inserted into the insertion port in a correct posture or not based on the integrated value.

In at least an embodiment of the present invention, it is preferable that the card insertion part includes an insertion detection mechanism structured to detect the card inserted into the insertion port, the insertion detection mechanism is connected with the control section and is disposed so that, in a case that a normal card is inserted into the insertion port in a correct posture, the insertion detection mechanism detects the card having been inserted into the insertion port before the one end of the external connection terminal in the short widthwise direction of the card is reached to the metal detection mechanism, and the control section acquires a metal detection signal value at a predetermined cycle over at least a part of a time period as a detection time after the card inserted into the insertion port is detected by the insertion detection mechanism and until the tip end of the card is detected by the tip end detection mechanism. According to this structure, influence of noise detected by the metal detection mechanism before a card is inserted into the insertion port can be eliminated. Therefore, accuracy of the calculated integrated value can be enhanced and, as a result, it can be further appropriately determined whether a card has been inserted into the insertion port in a correct posture or not.

In at least an embodiment of the present invention, it is preferable that the control section stores a signal level of an output signal of the metal detection mechanism when the card inserted into the insertion port is detected by the insertion detection mechanism as a reference value, and the metal detection signal value is a difference between a signal level of an output signal of the metal detection mechanism acquired at the predetermined cycle and the reference value. According to this structure, a metal detection signal value can be acquired which eliminates influence of variation of external environment such as variation of ambient temperature of the card reader. Therefore, accuracy of an acquired metal detection signal value can be enhanced and accuracy of the integrated value can be enhanced. As a result, it can be further appropriately determined whether a card has been inserted into the insertion port in a correct posture or not.

In at least an embodiment of the present invention, it is preferable that the card reader includes a card conveying mechanism structured to convey the card at a constant speed when the card inserted into the insertion port is detected by the insertion detection mechanism. A case that the card is inserted into the insertion port from a side of the one end face in the short widthwise direction of the card so that the external connection terminal passes the metal detection mechanism is a case that the card is inserted into the insertion port in a correct posture. In a case that the normal card is inserted into the insertion port in a correct posture and is conveyed by the card conveying mechanism, a first elapsed time is defined as a time period after the card inserted into the insertion port is detected by the insertion detection mechanism and until a predetermined time before the one end of the external connection terminal in the short widthwise direction of the card is reached to the metal detection mechanism and, in a case that the normal card is inserted into the insertion port from the other end face side in the short widthwise direction of the card so that the external connection terminal passes the metal detection mechanism and is conveyed by the card conveying mechanism, a second elapsed time is defined as a time period after the card inserted into the insertion port is detected by the insertion detection mechanism and until a predetermined time before the other end of the external connection terminal in the short widthwise direction of the card is reached to the metal detection mechanism. In this case, it is preferable that the control section calculates the integrated value by integrating at least a part of a plurality of the metal detection signal values acquired in the detection time, the detection time being at least a part of a time period after the first elapsed time has elapsed from the time when the card inserted into the insertion port is detected by the insertion detection mechanism and until the second elapsed time has elapsed from the time when the card inserted into the insertion port is detected by the insertion detection mechanism.

According to this structure, in a case that a card is inserted in a correct posture, the metal detection signal values are integrated over a time period from the time before the external connection terminal is reached to the metal detection mechanism and until the time after the external connection terminal has been reached to the metal detection mechanism to calculate an integrated value. Further, in a case that a card is inserted from the other end face in the short widthwise direction of the card so that its external connection terminal passes the metal detection mechanism, the metal detection signal values before the external connection terminal is reached to the metal detection mechanism can be integrated to calculate an integrated value.

Therefore, a difference between the integrated value in a case that a card is inserted in a correct posture and the integrated value in a case that a card is inserted from the other end face in a short widthwise direction of the card so that its external connection terminal passes the metal detection mechanism can be made larger. As a result, it can be further appropriately determined whether a card has been inserted into the insertion port in a correct posture or not based on the integrated value. Further, a difference can be made further clear between an integrated value in a case that a low reactive card is inserted in a correct posture and an integrated value in a case that a card commonly available on the market is inserted in a state that its rear face is directed upward. As a result, even when a low reactive card is inserted into the insertion port, it can be further appropriately determined whether a card has been inserted into the insertion port in a correct posture or not based on the integrated value.

In at least an embodiment of the present invention, a distance between the tip end detection mechanism and the metal detection mechanism may be set in a range which is longer than a distance between the tip end of the card inserted in a correct posture and the external connection terminal and is shorter than a total length of the distance and a length in the short widthwise direction of the external connection terminal. Further, the detection time may be set in a time period with a time point when the tip end detection mechanism detects the tip end of the card as a reference time point so that the detection time starts before the tip end detection mechanism detects the tip end of the card when the normal card is inserted into the insertion port in a correct posture, and that the detection time ends before the external connection terminal is reached to the metal detection mechanism when the normal card is inserted into the insertion port from the other end face side in the short widthwise direction of the card so that the external connection terminal passes the metal detection mechanism.

In at least an embodiment of the present invention, it may be structured that the card reader includes a card conveying mechanism structured to convey the card, when the insertion detection mechanism detects that the card is inserted into the insertion port, while the card conveying mechanism is activated to convey the card at a constant speed, the metal detection signal value based on the output signal of the metal detection mechanism is acquired at a predetermined cycle until the tip end of the card is detected by the tip end detection mechanism, and the integrated value obtained by integrating the metal detection signal values in the detection time is compared with a predetermined detection threshold value and thereby it is determined whether the normal card has been inserted into the insertion port in a correct posture or not.

Effects of the Invention

As described above, according to at least an embodiment of the present invention, in the card reader in which a substantially rectangular-shaped IC card in conformity with the international standard or JIS standard is taken into in its longitudinal direction and processed, even when a shutter member for opening and closing a card passage where the card is passed is not provided, it can be easily determined whether a posture of the inserted card is correct or not. Further, according to at least an embodiment of the present invention, in the card reader in which a substantially rectangular-shaped IC card in conformity with the international standard or JIS standard is taken into in its short widthwise direction and processed, it can be easily determined whether a posture of the inserted card is correct or not.

Further, according to at least an embodiment of the present invention, in the card reader in which a substantially rectangular-shaped IC card in conformity with the international standard is taken into in its short widthwise direction and processed, in a case that the size of an external connection terminal is the smallest, even when sensibility of the metal detection mechanism is lowered, it can be appropriately detected whether a card formed with an external connection terminal is inserted into the insertion port or not based on a detected result of the metal detection mechanism.

Further, according to at least an embodiment of the present invention, in the card reader in which a substantially rectangular-shaped IC card in conformity with the international standard is taken into in its short widthwise direction and processed, it can be appropriately determined whether a card is inserted into the insertion port in a correct posture or not. Further, according to at least an embodiment of the present invention, in a control method for a card reader in which a substantially rectangular-shaped IC card in conformity with the international standard is taken into in its short widthwise direction and processed, it can be appropriately determined whether a card is inserted into the insertion port in a correct posture or not.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings.

[First Embodiment]

At least an embodiment of a card reader will be described below.

(Schematic Structure of Card Reader)

Figure 1:
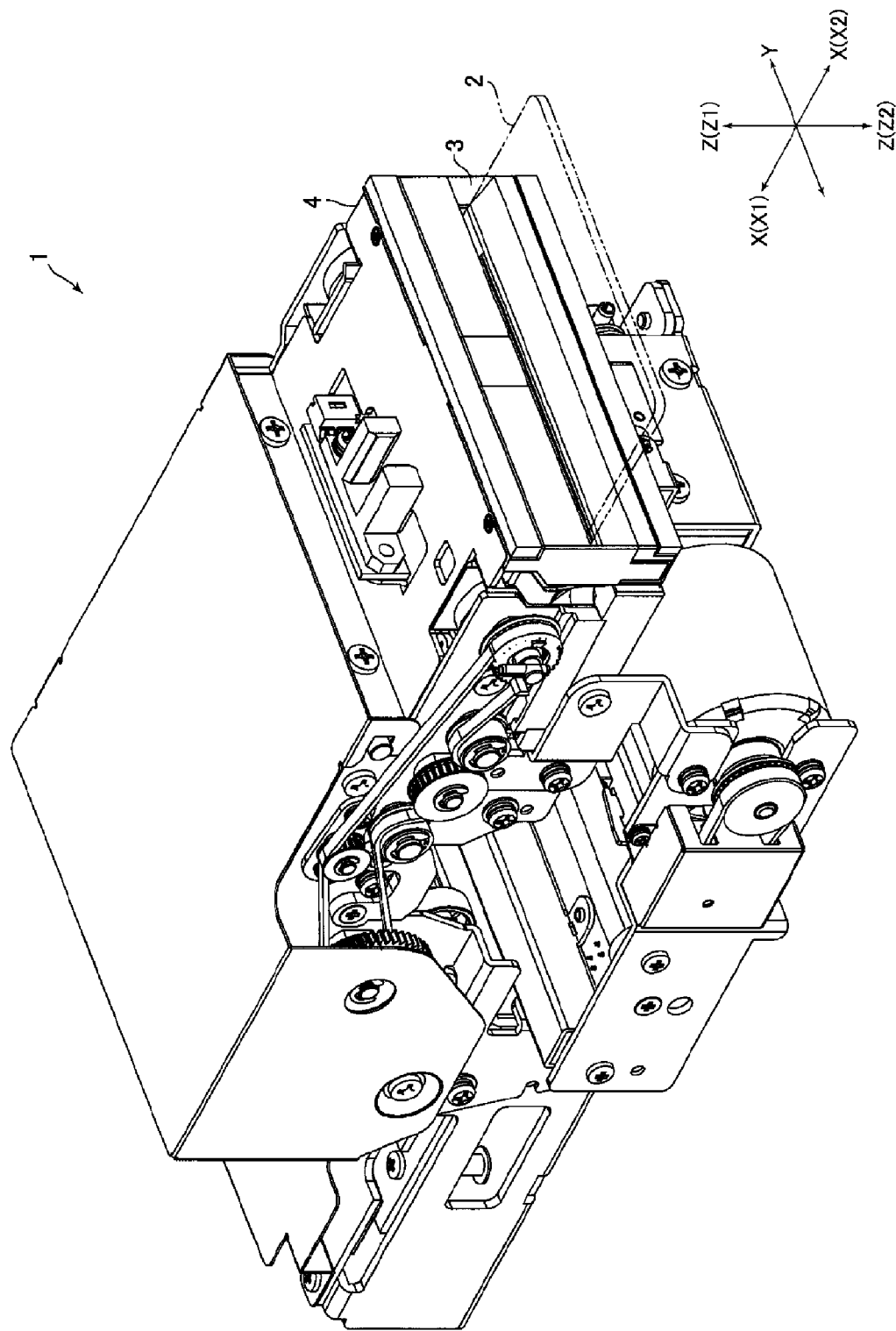
FIG. 1 is a perspective view showing a card reader in accordance with respective embodiments of the present invention.

FIG. 1 is a perspective view showing a card reader 1 in accordance with an embodiment of the present invention. A card reader 1 in this embodiment is a device for performing at least one of reading of data recorded in a card 2 and recording of data to a card 2 and is mounted for use on a predetermined host device such as an ATM (Automated Teller Machine). The card reader 1 includes a card insertion part 4 formed with an insertion port 3 into which a card 2 is inserted. Further, an inside of the card reader 1 is formed with a card passage 5 (see FIG. 2) where a card 2 inserted into the insertion port 3 is passed. The card passage 5 is formed so as to be connected with the insertion port 3. Further, the card reader 1 includes a card conveying mechanism structured to convey a card 2 in the card passage 5.

The card 2 is made of vinyl chloride and its thickness is about 0.7-0.8 mm. The card 2 in this embodiment is a contact type IC card with a magnetic stripe in conformity with the international standard (for example, ISO/IEC 7811) or JIS standard (for example, JISX 6302) and is formed in a substantially rectangular shape whose four corners are rounded. A rear face 2b of the card 2 is formed with a magnetic stripe (not shown) in which magnetic data are recorded.

Figure 14A:
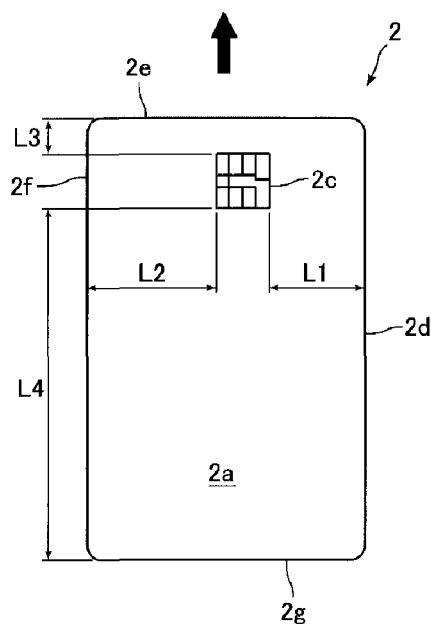
FIGS. 14(A), 14(B) and 14(C) are views for explaining a problem in the conventional technique.
Figure 14B:
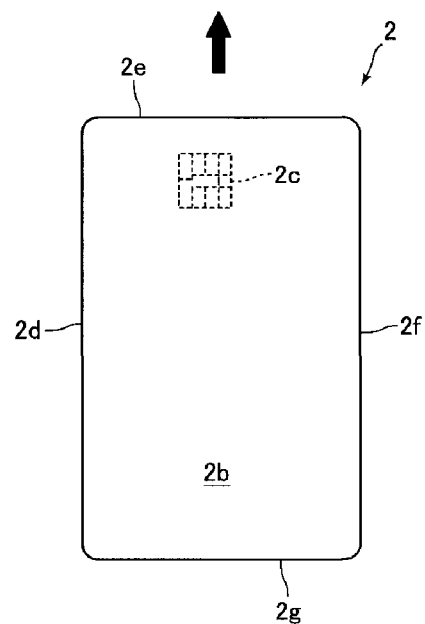
Figure 14C:
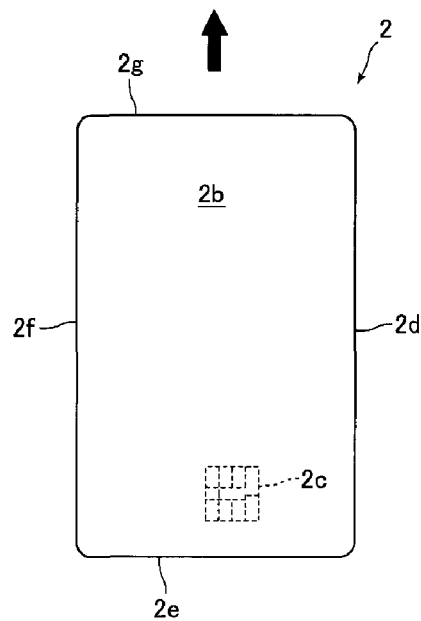

The card 2 is incorporated with an IC chip not shown and, as described above (in other words, as described with reference to FIG. 14(A)), a front face 2a of the card 2 is formed with an external connection terminal 2c. In other words, an external connection terminal 2c is formed at a predetermined position with one end 2d in a short widthwise direction of the card 2 and one end 2e in a longitudinal direction of the card 2 as references. Further, a distance "L1" between the one end 2d and the external connection terminal 2c and a distance "L2" between the other end 2f in a short widthwise direction of the card 2 and the external connection terminal 2c are different from each other, and a distance "L3" between the one end 2e and the external connection terminal 2c and a distance "L4" between the other end 2g in a longitudinal direction of the card 2 and the external connection terminal 2c are different from each other.

In this embodiment, a card 2 is conveyed in an "X" direction shown in FIG. 1. Specifically, a card 2 is inserted and taken in an "X1" direction and the card 2 is ejected in an "X2" direction. In other words, the "X" direction is a conveying direction of a card 2, the "X1" direction is an inserting direction of a card 2, and the "X2" direction is an ejecting direction of a card 2. Further, in this embodiment, a card 2 is inserted into the card reader 1 so that the short widthwise direction of a card 2 is coincided with the "X" direction. Further, the card 2 is conveyed in an inside of the card reader 1 so that the short widthwise direction of a card 2 is coincided with the "X" direction. In other words, in the card reader 1, a card 2 is taken into in a short widthwise direction of the card 2 and processed.

A "Y" direction perpendicular to the "X" direction is a width direction of a card 2 inserted into the insertion port 3 and is a longitudinal direction of the card 2 taken into an inside of the card reader 1 in a correct posture. Further, a "Z" direction in FIG. 1 perpendicular to the "X" direction and the "Y" direction is a thickness direction of a card 2 which is taken into an inside of the card reader 1. In this embodiment, the card reader 1 is disposed so that the "Z" direction and a vertical direction are coincided with each other. In the following descriptions, the "X" direction is referred to as a "front and rear direction", the "Y" direction is referred to as a "right and left direction", and the "Z" direction is as an "upper and lower direction". Further, an "X1" direction side is referred to as a "rear (back)" side, an "X2" direction side is as a "front" side, a "Z1" direction side is as an "upper" side, and a "Z2" direction side is as a "lower" side.

The card reader 1 includes, in addition to the above-mentioned structures, a magnetic head structured to abut with a card 2 to perform reading of magnetic data recorded on the card 2 and recording magnetic data on the card 2, a head moving mechanism structured to move the magnetic head in a right and left direction perpendicular to the conveying direction of the card 2, an IC contact block structured to contact with the external connection terminal 2c of the card 2 to perform data communication, a contact block moving mechanism structured to move the IC contact block, and a positioning mechanism for positioning the card 2 having been taken into the inside of the card reader 1.

The head moving mechanism includes a carriage on which the magnetic head is mounted, a guide shaft for guiding the carriage in the right and left direction, a lead screw structured to feed the carriage in the right and left direction, a cam plate for moving the magnetic head up and down, a turning prevention shaft for preventing turning of the carriage with the guide shaft as a center, and the like. The head moving mechanism moves the magnetic head in the right and left direction and moves the magnetic head up and down between a position where the magnetic head is capable of abutting with a magnetic stripe of a card 2 and a position where the magnetic head is retreated from the card passage 5. The head moving mechanism in this embodiment moves the magnetic head so as to retreat to a lower side with respect to the card passage 5.

The IC contact block includes a plurality of IC contact springs structured to contact with an external connection terminal 2c of a card 2. The contact block moving mechanism moves the IC contact block between a position where the IC contact springs are capable of contacting with the external connection terminal and a position where the IC contact springs are retreated from the card passage 5. The contact block moving mechanism in this embodiment moves the IC contact springs so as to retreat to an upper side with respect to the card passage 5. The positioning mechanism includes a positioning member with which a rear end of a card 2 having been taken into an inside of the card reader 1 is abutted, and the like. The positioning mechanism positions a card 2 when the magnetic head and the IC contact block performs reading and recording of data.

(Structure of Card Insertion Part)

Figure 2:
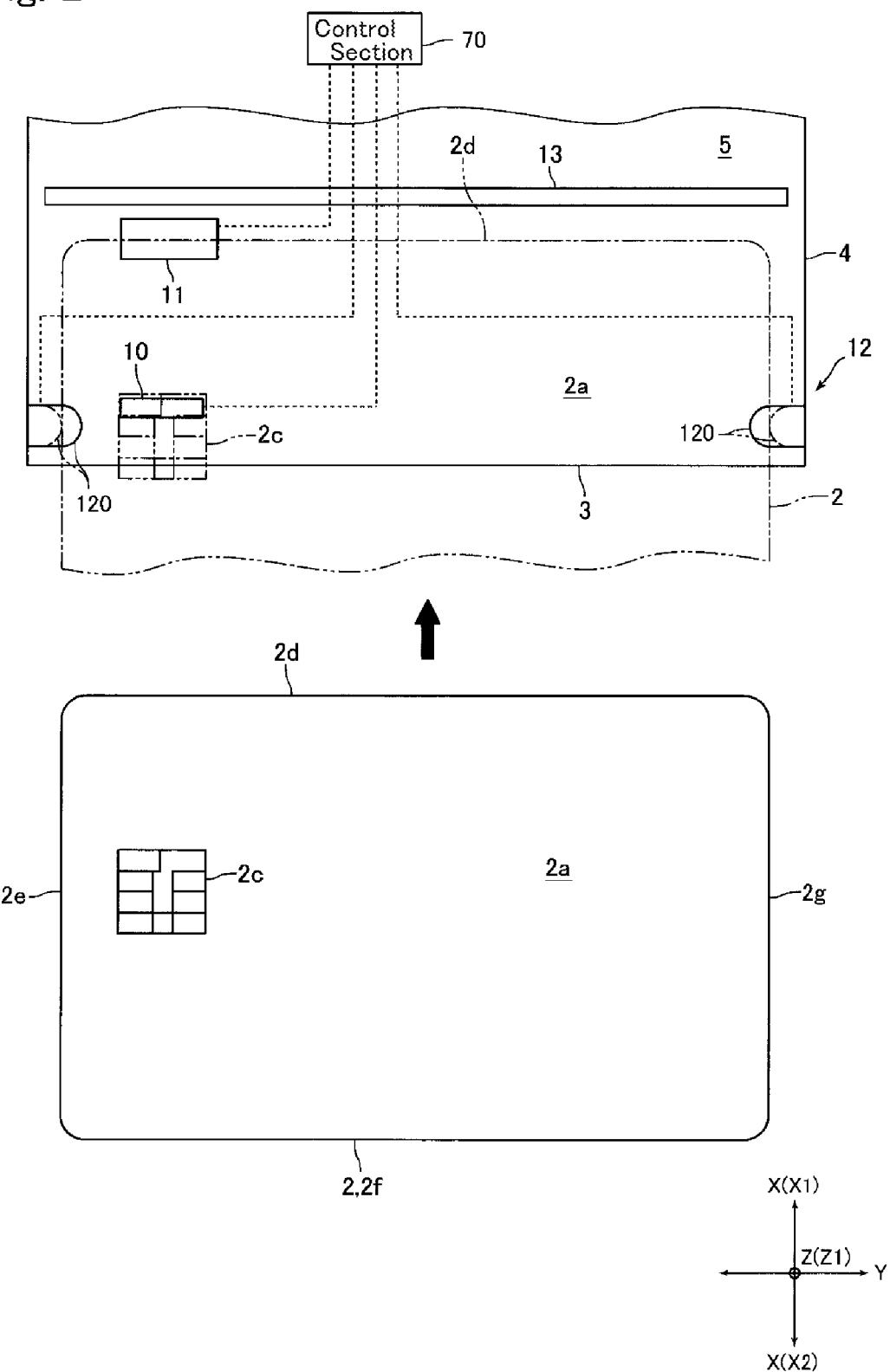
FIG. 2 is an explanatory view showing a schematic structure of a card insertion part shown in FIG. 1 in accordance with a first embodiment.
Figure 3:
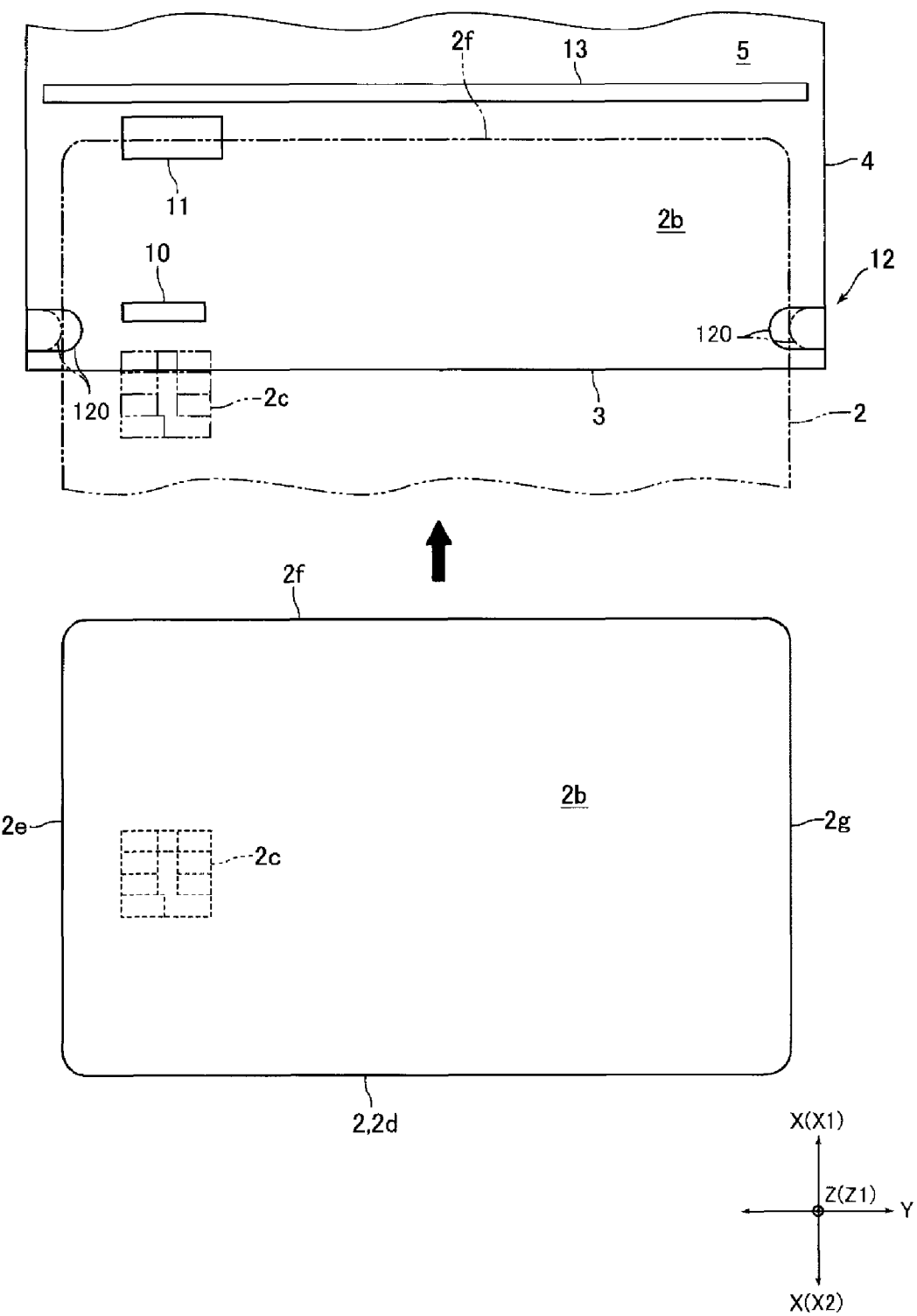
FIG. 3 is an explanatory view showing a schematic structure of a card insertion part shown in FIG. 1 in accordance with a first embodiment.

FIGS. 2 and 3 are explanatory views showing a schematic structure of the card insertion part 4 shown in FIG. 1 in accordance with a first embodiment. The card insertion part 4 structures a front face side portion of the card reader 1. The card insertion part 4 includes a metal detection mechanism 10 structured to detect an external connection terminal 2c of a card 2, a tip end detection mechanism 11 structured to detect a rear end of the card 2 inserted into the insertion port 3 (in other words, a tip end of the card 2 in an inserting direction), a width detection mechanism 12 structured to detect both end parts in a width direction of the card 2 ("Y" direction), and a shutter member 13 structured to open and close the card passage 5.

The metal detection mechanism 10 is a magnetic type sensor including an excitation coil, a detection coil, and a core which is formed of magnetic material and around which the excitation coil and the detection coil are wound. A magnetic type sensor having a structure shown in FIG. 6 which will be described below may be used. The metal detection mechanism 10 is disposed on a front side relative to the tip end detection mechanism 11 in the front and rear direction. Further, the metal detection mechanism 10, i.e., an opposed face of the core to a card 2 is disposed at a position in the right and left direction where an external connection terminal 2c of a card 2 inserted in a correct posture is passed (in other words, a posture where reading and recording of magnetic data by the magnetic head can be performed and reading and recording of data by the IC contact block can be performed (in other words, processing of the card 2 in the card reader 1 can be performed)).

In this embodiment, a case that a card 2 is inserted into the insertion port 3 from one end 2d side in a short widthwise direction of the card 2 in a state that its front face 2a is directed upward is a case that the card 2 is inserted in a correct posture. Therefore, when a card 2 is inserted into the insertion port 3 from the one end 2d side in a state that its front face 2a is directed upward, an external connection terminal 2c of the card 2 is detected by the metal detection mechanism 10. In this case, even when a card 2 is inserted into the insertion port 3 from the other end 2f side in a short widthwise direction of the card 2 in a state that its front face 2a is directed downward, if an external connection terminal 2c is passed at a disposing position of the metal detection mechanism 10, the external connection terminal 2c is detected by the metal detection mechanism 10.

The tip end detection mechanism 11 is an optical sensor which includes a light emitting element and a light receiving element which receives light from the light emitting element. The tip end detection mechanism 11 in this embodiment is a transmission type optical sensor and the light emitting element and the light receiving element are disposed so as to interpose the card passage 5 in the upper and lower direction. The tip end detection mechanism 11 is disposed on a rear side relative to the metal detection mechanism 10 in the front and rear direction. In accordance with an embodiment of the present invention, the tip end detection mechanism 11 may utilize a reflection type optical sensor.

In this embodiment, as shown in FIG. 2, the metal detection mechanism 10 and the tip end detection mechanism 11 are disposed at positions where the metal detection mechanism 10 detects an external connection terminal 2c when the tip end detection mechanism 11 detects a rear end (tip end) of a card 2 inserted into the insertion port 3 in a correct posture. In other words, a distance between the metal detection mechanism 10 and the tip end detection mechanism 11 in the front and rear direction is set to be substantially equal to a distance between a rear end of a card 2 inserted into the insertion port 3 in a correct posture and its external connection terminal 2c. Specifically, a distance between the metal detection mechanism 10 and the tip end detection mechanism 11 is set so that, when a rear end (tip end) of a card 2 inserted into the insertion port 3 in a correct posture is reached to a detection position of the tip end detection mechanism 11, the metal detection mechanism 10 is located above the external connection terminal 2c. In other words, a distance between a detection position of the metal detection mechanism 10 and a detection position of the tip end detection mechanism 11 is set in a range which is longer than the length "L1" in FIG. 14A but shorter than the sum of the length "L1" and a length in a short widthwise direction of the external connection terminal 2c (length between the "L1" and the "L2"). In FIG. 2, when a rear end of a card 2 is reached to a detection position of the tip end detection mechanism 11 and thereby its signal is outputted to a control section 70, the metal detection mechanism 10 is located at a position where the metal detection mechanism 10 faces the first connection terminal 2p and the fifth connection terminal 2t of the external connection terminal 2c shown in FIGS. 16(A) and 16(B). However, the metal detection mechanism 10 may be located above any connection terminal of the external connection terminal 2c. On the other hand, as shown in FIG. 3, it is required that, when a card 2 is inserted into the insertion port 3 from the other end 2f side in a state that its front face 2a is directed downward and the tip end detection mechanism 11 detects a rear end of the card 2, the metal detection mechanism 10 is disposed at a position where the metal detection mechanism 10 does not detect the external connection terminal 2c located on the rear face side.

The width detection mechanism 12 is disposed on a front side relative to the tip end detection mechanism 11 in the front and rear direction. The width detection mechanism 12 includes two detection levers 120, which are disposed on both end sides in the right and left direction of the card insertion part 4 and are capable of protruding to and retreating from the card passage 5, and two optical or mechanical type sensors which detect respective movements of the two detection levers 120. In a standby state before a card 2 is inserted into the card reader 1, parts of the detection levers 120 are disposed in an inside of the card passage 5. In this state, when a card 2 is inserted into the insertion port 3 so that a short widthwise direction of the card 2 is coincided with the front and rear direction, both ends in the right and left direction of the card 2 are respectively contacted with the two detection levers 120 and the detection levers 120 are turned. Therefore, it is detected on the basis of detected results of two sensors whether a card 2 has been inserted into the insertion port 3 so that a short widthwise direction of the card 2 is coincided with the front and rear direction or not.

The shutter member 13 is disposed on a rear side relative to the tip end detection mechanism 11 in the front and rear direction. Specifically, the shutter member 13 is disposed at a rear end of the card insertion part 4. The shutter member 13 is connected with a drive mechanism for the shutter member 13 having a solenoid and the like and the shutter member 13 is movable between a closing position where the shutter member 13 is located so as to close the card passage 5 and an open position where the shutter member 13 is retreated to a lower side with respect to the card passage 5 to open the card passage 5.

The metal detection mechanism 10, the tip end detection mechanism 11 and the width detection mechanism 12 are connected with a control section 70 of the card reader 1. An output signal of the metal detection mechanism 10, an output signal of the tip end detection mechanism 11 and an output signal of the width detection mechanism 12 are inputted to the control section 70. The control section 70 determines whether a card 2 has been inserted into the insertion port 3 in a correct posture or not based on an output signal of the metal detection mechanism 10, an output signal of the tip end detection mechanism 11 and an output signal of the width detection mechanism 12.

Specifically, first, the control section 70 determines whether a card 2 is inserted into the insertion port 3 so that a short widthwise direction of the card 2 is coincided with the front and rear direction or not based on an output signal of the width detection mechanism 12. Further, in this embodiment, in a case that a card 2 is inserted into the insertion port 3 so that a short widthwise direction of the card 2 is coincided with the front and rear direction and, in addition, the card 2 is inserted into the insertion port 3 from the one end $2d$ side in a state that its front face $2a$ is directed upward (in other words, in a case that a card 2 is inserted into the insertion port 3 in a correct posture), as shown in FIG. 2, when the tip end detection mechanism 11 detects a rear end of the card 2, the metal detection mechanism 10 faces the external connection terminal $2c$ and thus the external connection terminal $2c$ is detected. However, in a case that a card 2 is inserted into the insertion port 3 from the other end $2f$ side in a state that its rear face $2b$ is directed upward (see FIG. 3), in a case that a card 2 is inserted into the insertion port 3 from the one end $2d$ side in a state that its rear face $2b$ is directed upward and, in a case that a card 2 is inserted into the insertion port 3 from the other end $2f$ side in a state that its front face $2a$ is directed upward, (in other words, in a case that a card 2 is inserted into the insertion port 3 in an incorrect posture), when the tip end detection mechanism 11 detects a rear end of the card 2, the metal detection mechanism 10 does not face the external connection terminal $2c$ and thus the external connection terminal $2c$ is not detected.

Therefore, the control section 70 determines whether the card 2 inserted into the insertion port 3 so that its short widthwise direction is coincided with the front and rear direction is inserted into the insertion port 3 in a correct posture or not based on an output signal of the metal detection mechanism 10 when the tip end detection mechanism 11 detects a rear end of a card 2. Specifically, the control section 70 acquires a signal level of an output signal of the metal detection mechanism 10 which does not face the external connection terminal $2c$ when the width detection mechanism 12 detects both end parts of the card 2 and a signal level of an output signal of the metal detection mechanism 10 when the tip end detection mechanism 11 detects a rear end of the card 2. Based on a difference of the two signal levels, the control section 70 determines whether the card 2 inserted into the insertion port 3 so that its short widthwise direction is coincided with the front and rear direction is inserted into the insertion port 3 in a correct posture or not.

(Schematic Operation of Card Reader)

In the card reader 1 structured as described above, in a standby state before a card 2 is inserted into the insertion port 3, the shutter member 13 is located at a closing position and the card passage 5 is closed. The shutter member 13 is moved to an open position when it is detected that a card 2 is inserted into the insertion port 3 so that a short widthwise direction of the card 2 is coincided with the front and rear direction based on a detected result of the width detection mechanism 12 and, in addition, it is detected that the card 2 has been inserted into the insertion port 3 from the one end $2d$ side in a state that its front face $2a$ is directed upward based on a detected result of the metal detection mechanism 10. In other words, when it is detected that a card 2 has been inserted into the insertion port 3 in a correct posture, the shutter member 13 is moved to the open position.

Further, when it is detected that a card 2 has been inserted into the insertion port 3 in a correct posture, the card conveying mechanism conveys the card 2 to a rear side and reading and recording of magnetic data by the magnetic head are performed and reading and recording of data through the IC contact block are performed.

(Principal Effects in this Embodiment)

As described above, the card reader 1 in this embodiment includes the width detection mechanism 12. Therefore, according to this embodiment, as described above, it can be easily determined whether a card 2 has been inserted into the insertion port 3 so that a short widthwise direction of the card 2 is coincided with the front and rear direction or not. Further, in this embodiment, the metal detection mechanism 10 and the tip end detection mechanism 11 are disposed at positions where the metal detection mechanism 10 detects an external connection terminal $2c$ of a card 2 (the metal detection mechanism 10 faces an external connection terminal $2c$) when the tip end detection mechanism 11 detects a rear end (tip end) of the card 2 inserted into the insertion port 3 in a correct posture (when the rear end of the card 2 is reached to and detected by the tip end detection mechanism 11 and an detection signal is outputted). Therefore, according to this embodiment, as described above, it can be easily determined whether a card 2 inserted into the insertion port 3 so that its short widthwise direction is coincided with the front and rear direction has been inserted in a correct posture or not based on an output signal of the metal detection mechanism 10 at the time when the tip end detection mechanism 11 detects a rear end of the card 2. In other words, in this embodiment, it can be easily determined whether a card 2 inserted into the insertion port 3 has been inserted in a correct posture or not.

Further, the card reader 1 in this embodiment includes the width detection mechanism 12. Therefore, it is capable of detecting whether a foreign matter has been inserted into the insertion port 3 or a card 2 has been inserted by using the width detection mechanism 12.

In this embodiment, it is determined whether a card 2 inserted into the insertion port 3 so that its short widthwise direction is coincided with the front and rear direction has been inserted into the insertion port 3 in a correct posture or not based on a difference between a signal level of an output signal of the metal detection mechanism 10 in a state that the metal detection mechanism 10 does not face an external connection terminal $2c$ of a card 2 when the width detection mechanism 12 detects both end parts of the card 2 and a signal level of an output signal of the metal detection mechanism 10 when the tip end detection mechanism 11 detects a rear end of the card 2. Therefore, according to this embodiment, even when a signal level of an output signal of the metal detection mechanism 10 is varied due to external factors such as variation of ambient temperature of the card reader 1, it can be determined whether a card 2 inserted into the insertion port 3 so that its short widthwise direction is coincided with the front and rear direction has been inserted in a correct posture or not in a state that an influence of the variation is restrained. Accordingly, in this embodiment, it can be determined whether a card 2 has been inserted in a correct posture or not with a high degree of accuracy.

In this embodiment, the shutter member 13 which closes the card passage 5 in a standby state is moved to an open position when it is detected that a card 2 has been inserted into the insertion port 3 from the one end 2d side in a state that its front face 2a is directed upward. Therefore, according to this embodiment, a card 2 inserted into the insertion port 3 in an incorrect posture can be prevented from being conveyed to a rear side of the card reader 1. Further, in this embodiment, a foreign matter inserted into the insertion port 3 can be prevented from entering to a rear side of the card reader 1 by the shutter member 13.

(Other Embodiments)

Although the present invention has been shown and described with reference to the first embodiment, various changes and modifications will be apparent to those skilled in the art from the teachings herein.

In the first embodiment described above, the card reader 1 includes the width detection mechanism 12. However, the card reader 1 may include no width detection mechanism 12. As described above, in a case that a card 2 is inserted into the insertion port 3 from the one end 2d side in a state that its front face 2a is directed upward (in other words, in a case that a card 2 is inserted into the insertion port 3 in a correct posture), when the tip end detection mechanism 11 detects a rear end of the card 2, the metal detection mechanism 10 faces and detects the external connection terminal 2c. However, in a case that a card 2 is inserted into the insertion port 3 from the other end 2f side in a state that its rear face 2b is directed upward, in a case that a card 2 is inserted into the insertion port 3 from the one end 2d side in a state that its rear face 2b is directed upward and, in a case that a card 2 is inserted into the insertion port 3 from the other end 2f side in a state that its front face 2a is directed upward, when the tip end detection mechanism 11 detects a rear end of the card 2, the metal detection mechanism 10 does not face the external connection terminal 2c and thus the metal detection mechanism 10 does not detect the external connection terminal 2c. Further, even in a case that a card 2 is inserted into the insertion port 3 so that a longitudinal direction of the card 2 is coincided with the front and rear direction, when the tip end detection mechanism 11 detects a rear end of the card 2, the metal detection mechanism 10 does not detect the external connection terminal 2c.

Therefore, in a case that the card reader 1 includes no width detection mechanism 12, the control section 70 determines whether a card 2 has been inserted into the insertion port 3 in a correct posture or not based on an output signal of the metal detection mechanism 10 when the tip end detection mechanism 11 detects a rear end of the card 2. Specifically, the control section 70 determines whether a card 2 has been inserted into the insertion port 3 in a correct posture or not based on an absolute value of a signal level of an output signal of the metal detection mechanism 10 when the tip end detection mechanism 11 detects a rear end of the card 2. In accordance with an embodiment of the present invention, even in a case that the card reader 1 includes the width detection mechanism 12, the control section 70 may determine whether a card 2 has been inserted into the insertion port 3 in a correct posture or not based on an absolute value of a signal level of an output signal of the metal detection mechanism 10 when the tip end detection mechanism 11 detects a rear end of the card 2. In other words, it may be determined whether a card 2 has been inserted into the insertion port 3 in a correct posture or not without using the width detection mechanism 12.

In the embodiment described above, the tip end detection mechanism 11 is an optical type sensor but the tip end detection mechanism 11 may utilize a mechanical type sensor such as a micro switch. Further, the tip end detection mechanism 11 may be structured of a lever member, which is structured to be contacted with and moved by a card 2, and an optical or mechanical type sensor which detects movement of the lever member. Further, in the embodiment described above, the width detection mechanism 12 is structured of the detection lever 120 and a sensor which detects movement of the detection lever 120. However, the width detection mechanism 12 may be structured of an optical or mechanical type sensor which directly detects a card 2

In the embodiment described above, the card reader 1 is a card reader in which a card 2 in a substantially rectangular shape in conformity with the international standard or JIS standard is taken into in its short widthwise direction and is processed. However, the card reader to which at least an embodiment of the present invention is applied may be a card reader in which a card 2 in a substantially rectangular shape in conformity with the international standard or JIS standard is taken into in its longitudinal direction and is processed. In this case, even when the shutter member 13 structured to open and close the card passage 5 is not provided, it can be determined whether a posture of an inserted card 2 is correct or not based on an output signal of the metal detection mechanism 10 when the tip end detection mechanism 11 detects a rear end of the card 2.

[Second Embodiment]

A second embodiment of the present invention will be described below. A basic structure of a card reader in this embodiment is substantially the same as the card reader 1 shown in FIG. 1 and is provided with similar functions and thus the same reference signs are used in the same structures and their detailed descriptions are omitted.

Figure 16A:
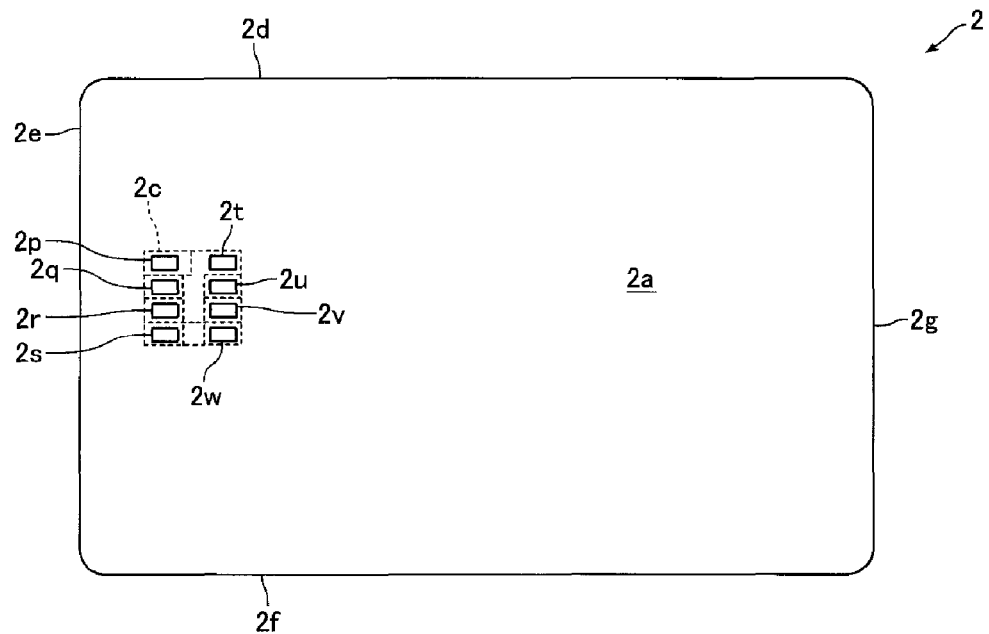
FIGS. 16(A) and 16(B) are views for explaining an arrangement range of a first through an eighth connection terminals which structure an external connection terminal of an IC card specified in the international standard.

The card 2 is made of vinyl chloride and its thickness is about 0.7-0.8 mm. A rear face 2b of the card 2 is formed with a magnetic stripe (not shown) in which magnetic data are recorded. The card 2 in this embodiment is a card in conformity with the "ISO/IEC 7816-2" and is formed in a substantially rectangular shape whose four corners are rounded. Further, the card 2 is incorporated with an IC chip not shown and, as shown in FIG. 16(A), a front face 2a of the card 2 is formed with an external connection terminal 2c of the IC chip.

Figure 16B:
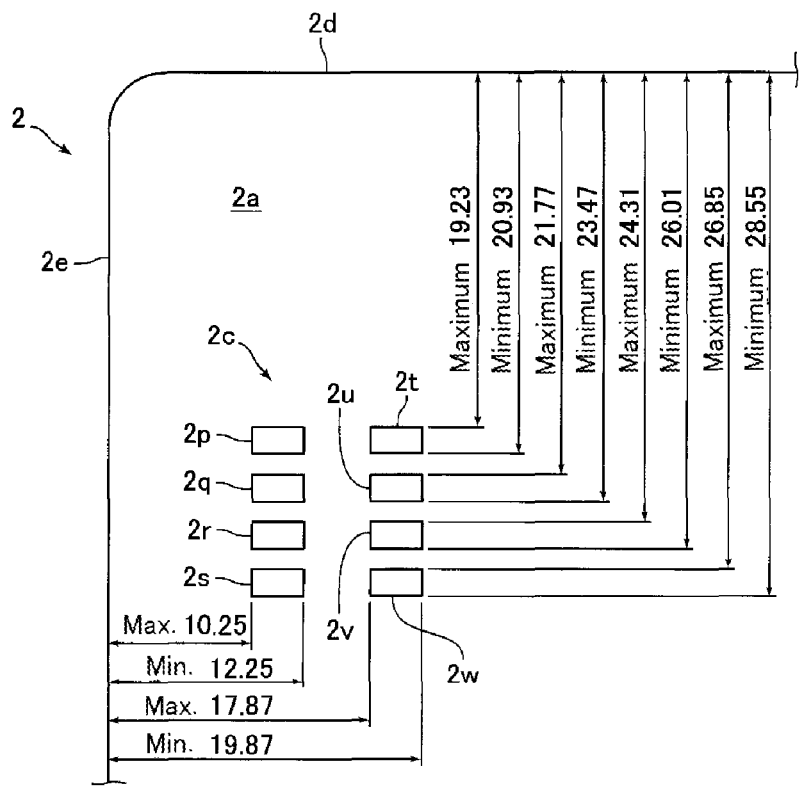

As described above, an arrangement range of the first through the eighth connection terminals 2p through 2w is specified in the international standard "ISO/IEC7816-2" and the arrangement range of the first through the eighth connection terminals 2p through 2w are specified in dimensions shown in FIG. 16(B) with the one end face 2e in a longitudinal direction of the card 2 and the one end face 2d in a short widthwise direction of the card 2 as the references. In this embodiment, for example, the first through the eighth connection terminals 2p through 2w are formed with dimension values shown in FIG. 16(B) and, in this case, the sizes of the first through the eighth connection terminals 2p through 2w are the smallest.

Specifically, the external connection terminal 2c is structured of a first connection terminal 2p, a second connection terminal 2q, a third connection terminal 2r, a fourth connection terminal 2s, a fifth connection terminal 2t, a sixth connection terminal 2u, a seventh connection terminal 2v and an eighth connection terminal 2w. In a card 2 in the second embodiment, the first through the fourth connection terminals 2p through 2s are, as shown in FIGS. 16(A) and 16(B), disposed in this order from the one end face 2d side in a short widthwise direction of the card 2 and disposed at the same positions as each other in a longitudinal direction of the card 2. Further, in the short widthwise direction of the card 2, the fifth connection terminal 2t is disposed at the same position as the first connection terminal 2p, the sixth connection terminal 2u is disposed at the same position as the second connection terminal 2q, the seventh connection terminal 2v is disposed at the same position as the third connection terminal 2r, and the eighth connection terminal 2w is disposed at the same position as the fourth connection terminal 2s. Further, the fifth through the eighth connection terminals 2t through 2w are disposed at the same positions as each other in a longitudinal direction of the card 2 and are disposed at separated positions from the one end face 2e relative to the first through the fourth connection terminals 2p through 2s. The one end face 2e in this embodiment is a first card reference end face which is one end face of a card 2 in a longitudinal direction of the card 2, and the one end face 2d is a second card reference end face which is one end face of a card 2 in a short widthwise direction of the card 2.

In this embodiment, a case that a card 2 is inserted into the insertion port 3 from the one end face 2d side in a short widthwise direction of the card 2 in a state that its front face 2a is directed upward is a case that a card 2 is inserted into the insertion port 3 in a correct posture. Therefore, when a card 2 is inserted into the insertion port 3 so that the one end face 2d that is the second card reference end face is located on a rear side in a state that the one end face 2e that is the first card reference end face is contacted with the reference surface 5a, the first through the fourth connection terminals 2p through 2s and the fifth through the eighth connection terminals 2t through 2w of the external connection terminal 2c of the card 2 are arranged in two rows in an inserting direction of the card at a position near to the reference surface 5a of the card passage 5.

(Structure of Card Insertion Part)

Figure 4:
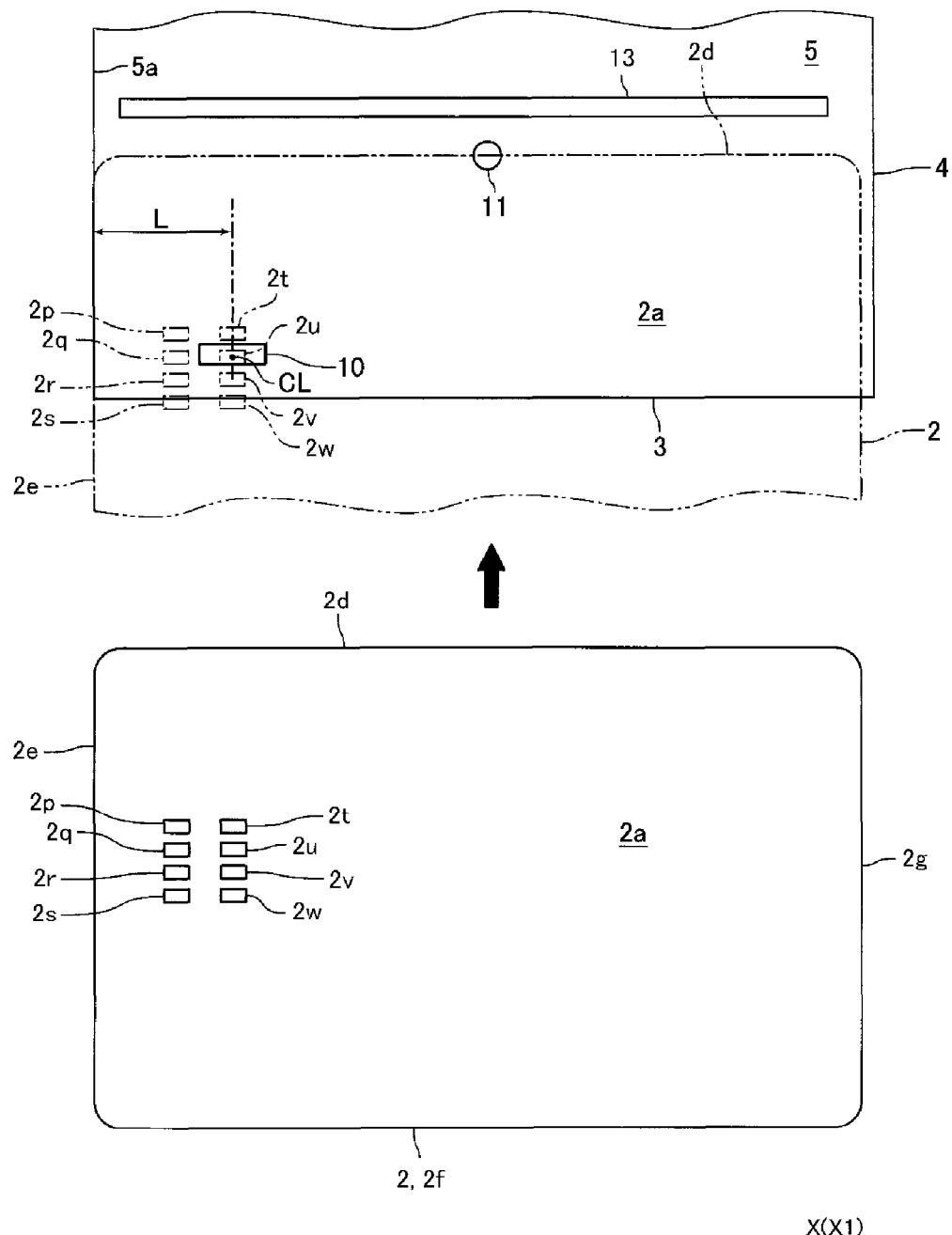
FIG. 4 is an explanatory view showing a schematic structure of a card insertion part shown in FIG. 1 in accordance with a second embodiment.
Figure 4:
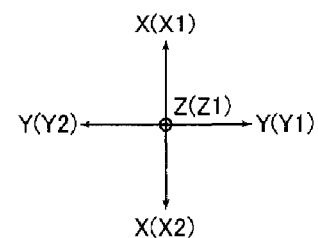
Figure 5:
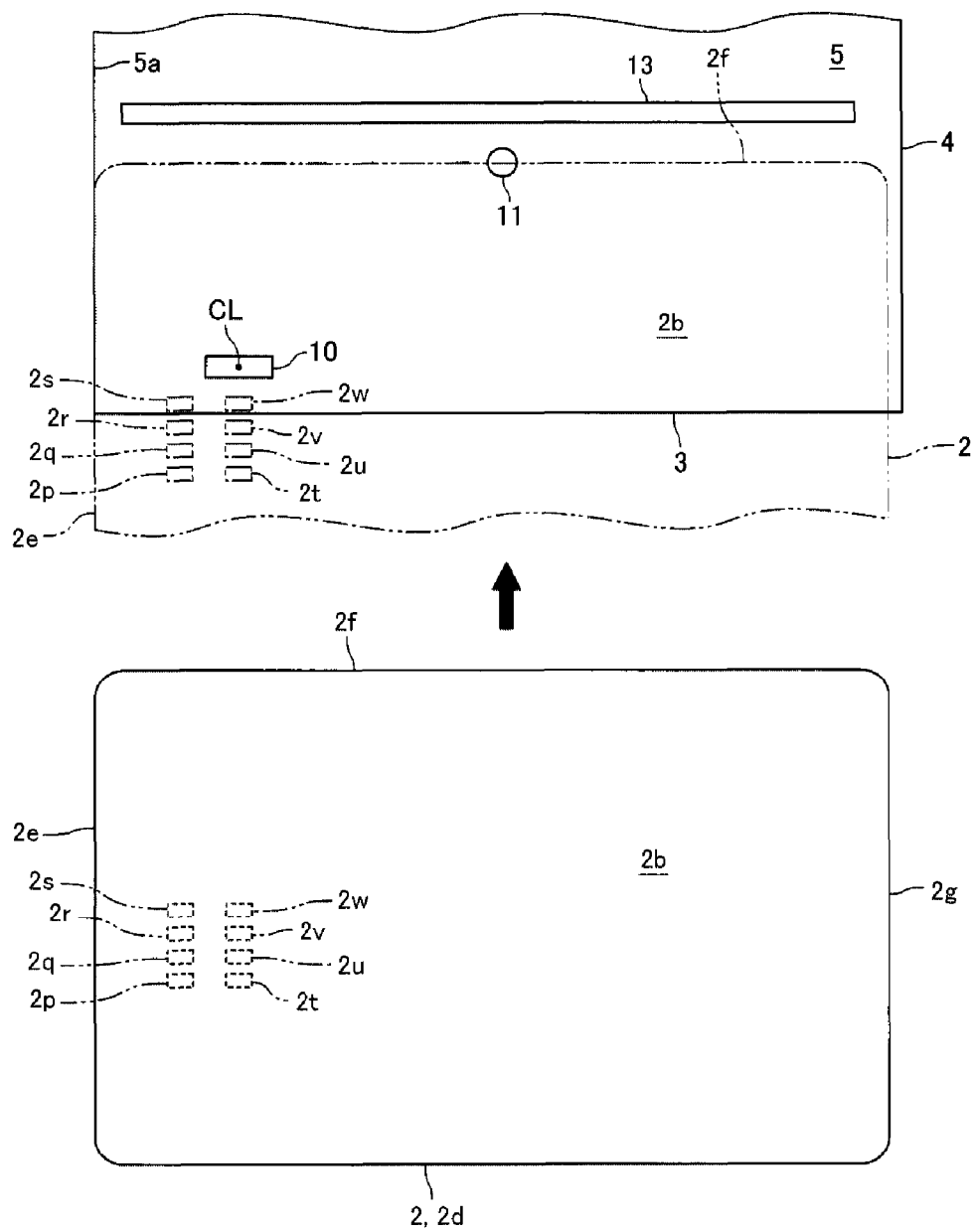
FIG. 5 is an explanatory view showing a schematic structure of a card insertion part shown in FIG. 1 in accordance with a second embodiment.
Figure 5:
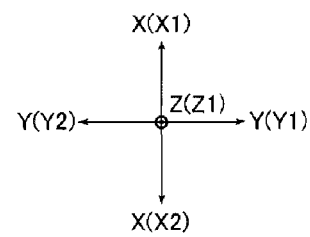
Figure 6:
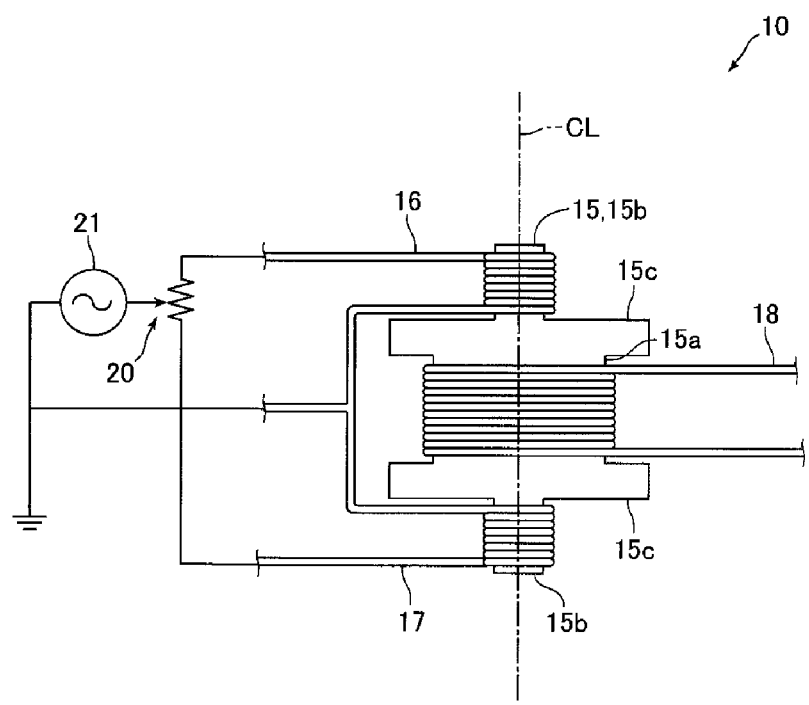
FIG. 6 is an explanatory view showing a structure of a metal detection mechanism in FIG. 4.

FIGS. 4 and 5 are explanatory views showing a schematic structure of the card insertion part 4 shown in FIG. 1 in accordance with the second embodiment. FIG. 6 is an explanatory view showing a structure of the metal detection mechanism 10 in FIG. 4.

The card insertion part 4 structures a front face side portion of the card reader 1. The card insertion part 4 includes, similarly to the first embodiment, a metal detection mechanism 10 structured to detect an external connection terminal 2c of a card 2, a tip end detection mechanism 11 structured to detect a rear end of the card 2 inserted into the insertion port 3 (in other words, a tip end of the card 2 in an inserting direction), and a shutter member 13 structured to open and close the card passage 5.

In the second embodiment, a width of the insertion port 3 in the right and left direction is set to be wider than a width in a longitudinal direction of a card 2. A left end of the card passage 5 is formed as a reference surface 5a with which a left end face of a card 2 inserted into the insertion port 3 is contacted. In other words, one end of the card passage 5 in the right and left direction is structured as a reference surface 5a with which one end face in the right and left direction of a card 2 inserted into the insertion port 3 is contacted. The reference surface 5a is formed in parallel to the "Z-X" plane structured of the upper and lower direction and the front and rear direction. Further, the reference surface 5a is a conveyance reference surface for a card 2 which is conveyed through the card passage 5. The card insertion part 4 is, for example, disposed with an urging member (not shown) such as a plate spring. A card 2 inserted into the insertion port 3 is urged to a left direction so that a left end face of the card 2 is contacted with the reference surface 5a by an urging force of the urging member.

In this embodiment, a case that a card 2 is inserted into the insertion port 3 from the one end face 2d side in a short widthwise direction of the card 2 in a state that its front face 2a is directed upward is a case that a card 2 is inserted into the insertion port 3 in a correct posture. Therefore, when a normal card 2 is inserted into the insertion port 3 in a correct posture without being inclined, its front face 2a is directed upward, its one end face 2d is disposed on a rear side, and its one end face 2e in a longitudinal direction of the card 2 is abutted with the reference surface 5a. In this specification, the phrase that "a card 2 is inserted into the insertion port 3 in a correct posture" also includes a case that a card 2 is inserted into the insertion port 3 in a state that a short widthwise direction of the card 2 is inclined with respect to the front and rear direction. On the other hand, in this specification, the phrase that "a card 2 is inserted into the insertion port 3 in a correct posture without being inclined" means that a card 2 is inserted into the insertion port 3 in a correct posture and in a state that a short widthwise direction of the card 2 is not inclined with respect to the front and rear direction.

The tip end detection mechanism 11 is an optical sensor which includes a light emitting element and a light receiving element which receives light from the light emitting element. The tip end detection mechanism 11 in this embodiment is a transmission type optical sensor and the light emitting element and the light receiving element are disposed so as to interpose the card passage 5 in the upper and lower direction. The tip end detection mechanism 11 in this embodiment is structured similarly to the tip end detection mechanism 11 in the first embodiment and, in this embodiment, the tip end detection mechanism 11 is disposed at a center part of the card passage 5 and shown by the "o" (circle) mark. The tip end detection mechanism 11 is disposed on a rear side relative to the metal detection mechanism 10 in the front and rear direction. In accordance with an embodiment of the present invention, the tip end detection mechanism 11 may utilize a reflection type optical sensor.

The metal detection mechanism 10 is, as shown in FIG. 6, a magnetic type sensor which includes a core 15 formed of magnetic material and a pair of excitation coils 16 and 17 and a detection coil 18 which are wound around the core 15 with an axial center "CL" of the core 15 as a winding center. The core 15 is formed in a thin plate shape whose thickness direction is a direction perpendicular to the drawing in FIG. 6. The core 15 is structured of a center core part 15a, which is disposed at a substantially center in an axial direction of the axial center "CL", a pair of axially end core parts 15b which are respectively disposed on both end sides of the center core part 15a in an axial direction of the axial center "CL", and flange parts 15c which are disposed between the center core part 15a and the axially end core parts 15b.

The excitation coils 16 and 17 are wound around a pair of the axially end core parts 15b. The detection coil 18 is wound around the center core part 15a. One end sides of the excitation coils 16 and 17 are connected with a variable resistor 20. The variable resistor 20 is connected with an AC power source 21. The other end sides of the excitation coils 16 and 17 are grounded. Both end parts of the detection coil 18 are connected with a detection circuit not shown. In the metal detection mechanism 10, variation of a magnetic field generated by the excitation coils 16 and 17 is detected by the detection coil 18 and thereby an external connection terminal 2c of a card 2 is detected.

The metal detection mechanism 10 is disposed on an upper side of the card passage 5. Further, the metal detection mechanism 10 is disposed so that an axial direction of the axial center "CL" of the core 15 and the upper and lower direction are coincided with each other and so that a lower end face of the axially end core part 15b is capable of facing a card 2. Further, in this embodiment, a distance "L" between the reference surface 5a and the axial center "CL" of the core 15 in the right and left direction is set not less than 17.87 mm and not more than 19.87 mm. In other words, the dimension of an external connection terminal 2c which is formed in a card used in this embodiment is set as shown in FIG. 16(B) and thus the axial center "CL" of the core 15 is provided so as to be capable of facing a far side row of the external connection terminal 2c of the card 2 with respect to the reference surface 5a of the card passage 5. Therefore, the metal detection mechanism 10 is disposed so that, when a normal card 2 is inserted into the insertion port 3 in a correct posture without inclination, the fifth through the eighth connection terminals 2t through 2w pass an extended line of the axial center "CL" of the core 15. For example, a distance "L" between the reference surface 5a and the axial center "CL" is set to be 18.87 mm.

Further, in this embodiment, the metal detection mechanism 10 is disposed so that, when a normal card 2 is inserted into the insertion port 3 in a correct posture, an external connection terminal 2c of the card 2 is detected by the metal detection mechanism 10 before the one end face 2d of the card 2 is detected by the tip end detection mechanism 11. In other words, a distance between the tip end detection mechanism 11 and the metal detection mechanism 10 is set longer than a distance between a rear end of a card inserted in a correct posture and its external connection terminal but is set shorter than a length which is the sum of the above-mentioned distance and a length in a short widthwise direction of the external connection terminal 2c. Specifically, as shown in FIG. 4, the metal detection mechanism 10 is disposed so that, in a case that a normal card 2 is inserted into the insertion port 3 in a correct posture without inclination, when the one end face 2d is detected by the tip end detection mechanism 11 (when a detection output by the tip end detection mechanism is varied), the axial center "CL" of the core 15 and the sixth connection terminal 2u are overlapped with each other in the upper and lower direction, in other words, the core 15 and the sixth connection terminal 2u are faced each other. Therefore, at least the fifth connection terminal 2t is detected by the metal detection mechanism 10 before the one end face 2d is detected by the tip end detection mechanism 11. In other words, a distance between the axial center "CL" of the core 15 and the tip end detection mechanism 11 in the front and rear direction is set to be substantially equal to a distance between the one end face 2d of a card 2 and its sixth connection terminal 2u.

Further, in this embodiment, in a case that a normal card 2 is inserted into the insertion port 3 from the other end face 2f side in a short widthwise direction of the card 2 in a state that its rear face 2b is directed upward, as shown in FIG. 5, when the other end face 2f is detected by the tip end detection mechanism 11, the eighth connection terminal 2w does not reach to a position where the metal detection mechanism 10 is disposed in the front and rear direction. Therefore, in the card reader 1 in this embodiment, it can be detected whether a normal card 2 is inserted into the insertion port 3 in a correct posture or not based on a detected result of the metal detection mechanism 10 when a rear end face of the card 2 is detected by the tip end detection mechanism 11.

(Schematic Operation of Card Reader)

In the card reader 1 structured as described above, in a standby state before a card 2 is inserted into the insertion port 3, the shutter member 13 is located at a closing position and the card passage 5 is closed. The shutter member 13 is moved to an open position when it is detected that a normal card 2 has been inserted into the insertion port 3 in a correct posture based on detected results of the metal detection mechanism 10 and the tip end detection mechanism 11. Further, when it is detected that a card 2 has been inserted into the insertion port 3 in a correct posture, the card conveying mechanism conveys the card 2 to a rear side and reading and recording of magnetic data by the magnetic head are performed and reading and recording of data through the IC contact block are performed.

(Principal Effects in this Embodiment)

As described above, in the second embodiment, when a normal card 2 is inserted into the insertion port 3 in a correct posture without inclination, the metal detection mechanism 10 is disposed so that the fifth through the eighth connection terminals 2t through 2w pass the extended line of the axial center "CL" of the core 15. Therefore, in this embodiment, in a case that the sizes of the first through the eighth connection terminals 2p through 2w are the smallest, even when sensibility of the metal detection mechanism 10 is lowered, the fifth through the eighth connection terminals 2t through 2w can be detected appropriately by the metal detection mechanism 10. Accordingly, in this embodiment, in a case that an external connection terminal 2c of a card 2 is formed to be the smallest, even when sensibility of the metal detection mechanism 10 is lowered, it can be appropriately detected whether a card 2 formed with an external connection terminal is inserted into the insertion port 3 or not based on a detected result of the metal detection mechanism 10.

In this embodiment, the metal detection mechanism 10 is disposed so that, in a case that a normal card 2 is inserted into the insertion port 3 in a correct posture without inclination, when the one end face 2d is detected by the tip end detection mechanism 11, the axial center "CL" of the core 15 and the sixth connection terminal 2u are overlapped with each other in the upper and lower direction (the core 15 and the sixth connection terminal 2u are faced each other). Therefore, in this embodiment, in comparison with a case that the metal detection mechanism 10 is disposed so that, in a case that a normal card 2 is inserted into the insertion port 3 in a correct posture without inclination, when the one end face 2d is detected by the tip end detection mechanism 11, the axial center "CL" of the core 15 and the fifth connection terminal 2t are overlapped with each other in the upper and lower direction, it can be detected by the metal detection mechanism 10 whether a card 2 formed with an external connection terminal 2c has been inserted into the insertion port 3 or not at a further earlier timing before a rear end face (tip end) of the card 2 is detected by the tip end detection mechanism 11. Accordingly, in this embodiment, a predetermined processing in the card reader 1 can be performed quickly after a rear end face (tip end) of a card 2 is detected by the tip end detection mechanism 11.

Figure 15A:
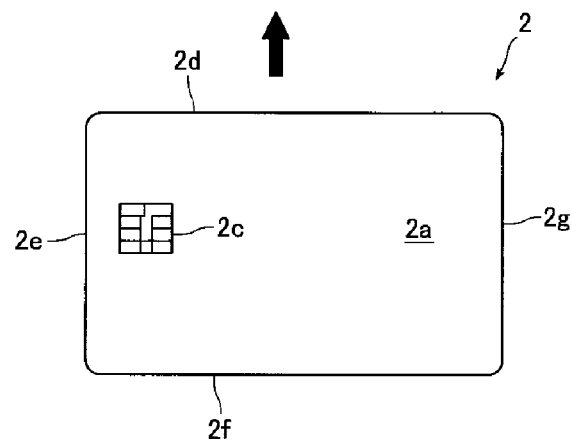
FIGS. 15(A) and 15(B) are views for explaining a problem in the conventional technique.
Figure 15B:
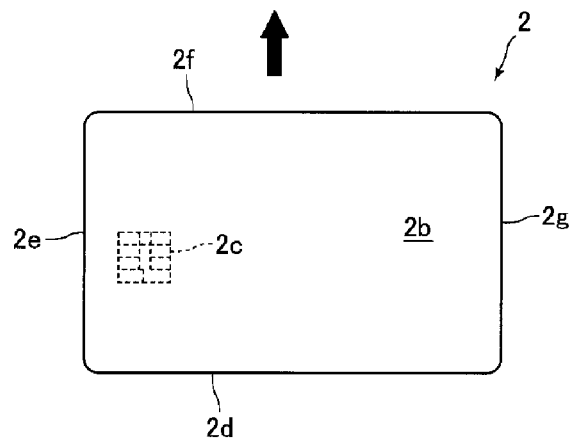

Further, in comparison with a case that the metal detection mechanism 10 is disposed so that, in a case that a normal card 2 is inserted into the insertion port 3 in a correct posture without inclination, when the one end face 2d (tip end) is detected by the tip end detection mechanism 11, the axial center "CL" of the core 15 and the seventh connection terminal 2v are overlapped with each other in the upper and lower direction, a distance between the eighth connection terminal 2w and the axial center "CL" of the core 15a in the front and rear direction can be made longer when a card 2 is inserted in the direction shown by the arrow in FIG. 15(B) and its other end face 2f is detected by the tip end detection mechanism 11. Therefore, according to this embodiment, when a card 2 is inserted in the direction shown by the arrow in FIG. 15(B) and its other end face 2f is detected by the tip end detection mechanism 11, the eighth connection terminal 2w is surely prevented from being detected by the metal detection mechanism 10 and, as a result, it can be further appropriately detected whether a card 2 has been inserted in a correct posture or not.

In this embodiment, a width of the insertion port 3 in the right and left direction is set to be wider than a width in a longitudinal direction of a card 2. Therefore, according to this embodiment, even when a card 2 is taken into the card reader 1 in its short widthwise direction, the card 2 is easily inserted into the insertion port 3.

(Other Embodiments)

In the above-mentioned second embodiment, a distance "L" between the reference surface 5a and the axial center "CL" of the core 15 in the right and left direction is set to be not less than 17.87 mm and not more than 19.87 mm. However, the present invention is not limited to this embodiment. For example, a distance "L" between the reference surface 5a and the axial center "CL" may be set not less than 10.25 mm and not more than 12.25 mm. In other words, the metal detection mechanism 10 may be disposed so that, when a normal card 2 is inserted into the insertion port 3 in a correct posture without inclination, the first through the fourth connection terminals 2p through 2s pass the extended line of the axial center "CL" of the core 15 (see FIG. 7(B) and FIG. 8(B)). For example, a distance "L" between the reference surface 5a and the axial center "CL" may be set to be 11.25 mm. In this case, the metal detection mechanism 10 is, for example, disposed so that, in a case that a normal card 2 is inserted into the insertion port 3 in a correct posture without inclination, when one end face 2d is detected by the tip end detection mechanism 11, the axial center "CL" of the core 15 and the second connection terminal 2q are overlapped with each other in the upper and lower direction. Also in this case, in a case that the sizes of the first through the eighth connection terminals 2p through 2w are the smallest, even when sensibility of the metal detection mechanism 10 is lowered, the first through the fourth connection terminals 2p through 2s can be appropriately detected by the metal detection mechanism 10. Therefore, it can be appropriately detected whether a card 2 formed with an external connection terminal 2c has been inserted into the insertion port 3 or not based on a detected result of the metal detection mechanism 10.

Figure 7A:
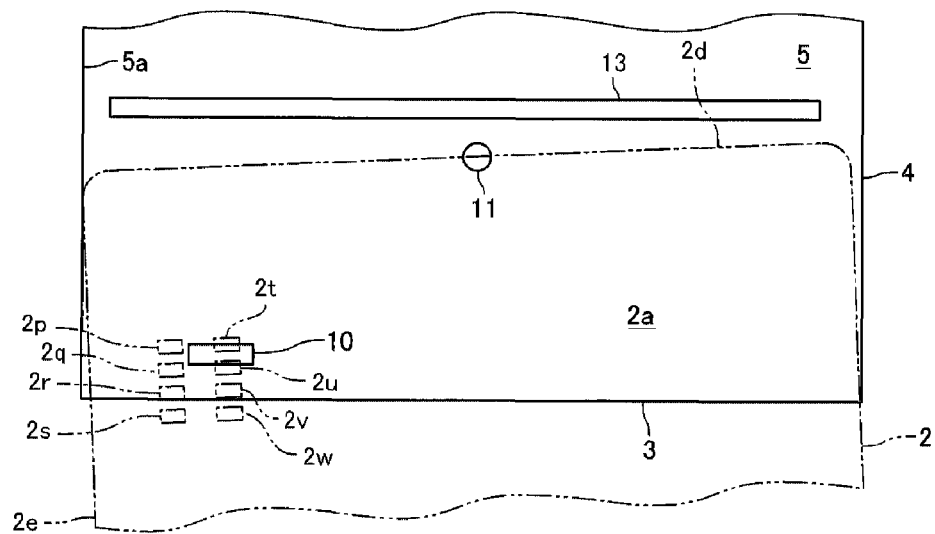
FIGS. 7(A) and 7(B) are explanatory views showing a difference of effects between a card insertion part in accordance with a second embodiment of the present invention and a card insertion part in accordance with another embodiment of the present invention.
Figure 7B:
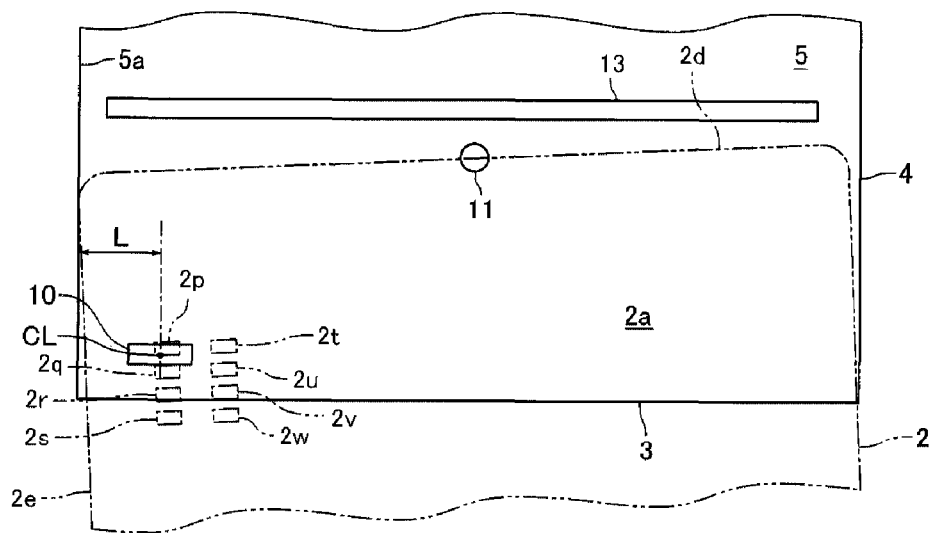
Figure 7B:
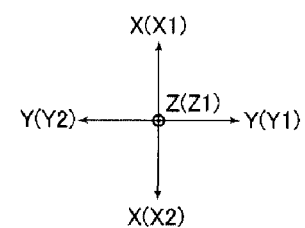

In the card reader 1 described above, a width of the insertion port 3 in the right and left direction is set to be wider than a width in a longitudinal direction of a card 2 and thus the card 2 is easily inclined. Therefore, it is preferable that a distance "L" between the reference surface 5a and the axial center "CL" is not less than 17.87 mm and not more than 19.87 mm. As shown in FIGS. 7(A) and 7(B), in a case that a card 2 inserted in a correct posture is inclined so that the one end face 2e side of the card 2 is disposed on a front side, detection of its external connection terminal by the metal detection mechanism 10 is delayed from a case that a card 2 is inserted in a correct posture without inclination. In this case, when a distance "L" between the reference surface 5a and the axial center "CL" is set to be not less than 17.87 mm and not more than 19.87 mm (see FIG. 7(A)), in comparison with a case that a distance "L" between the reference surface 5a and the axial center "CL" is set not less than 10.25 mm and not more than 12.25 mm (see FIG. 7(B)), it can be detected by the metal detection mechanism 10 whether a card 2 formed with an external connection terminal 2c has been inserted into the insertion port 3 or not at a further earlier timing before a rear end face of the card 2 is detected by the tip end detection mechanism 11. As a result, a predetermined processing in the card reader 1 can be performed quickly after a rear end face of a card 2 is detected by the tip end detection mechanism 11.

Figure 8A:
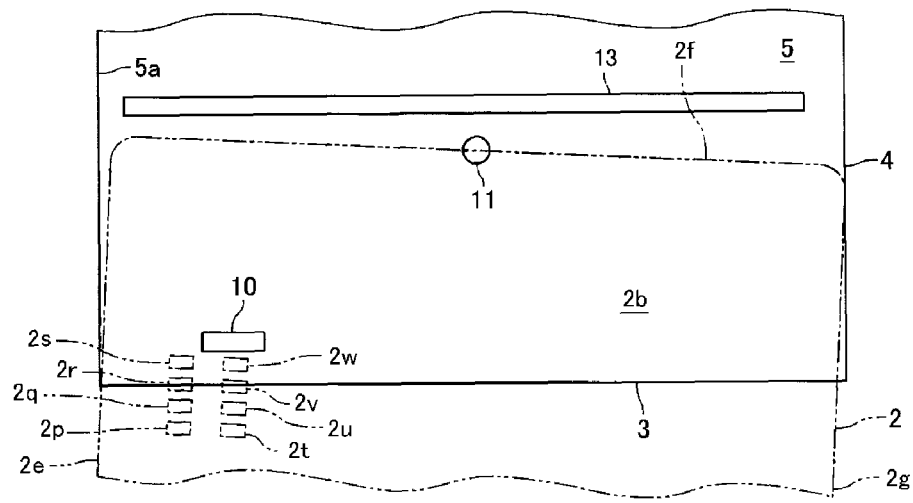
FIGS. 8(A) and 8(B) are explanatory views showing a difference of effects between a card insertion part in accordance with a second embodiment of the present invention and a card insertion part in accordance with another embodiment of the present invention.
Figure 8B:
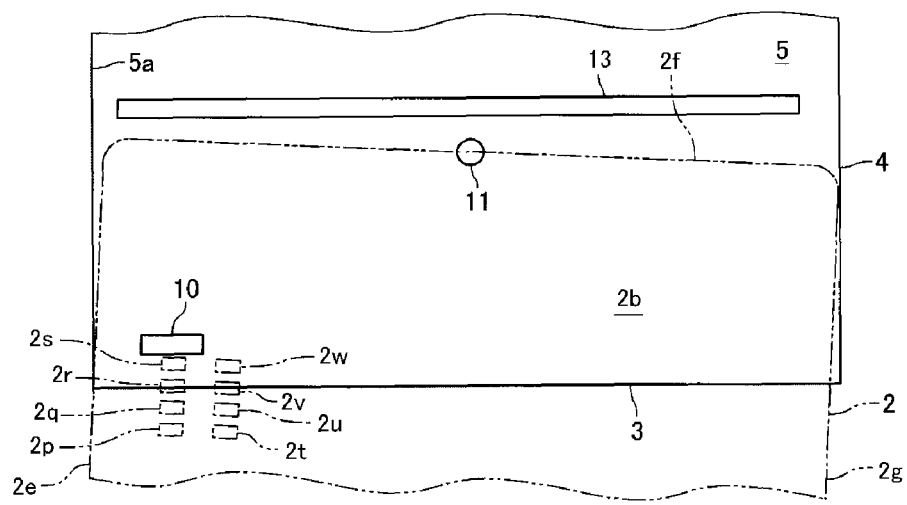
Figure 8B:
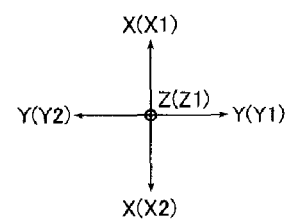

Further, as shown in FIGS. 8(A) and 8(B), in a case that a card 2 is inserted in the direction shown by the arrow in FIG. 15(B) and that the card 2 is inclined so that the other end face 2g side of the card 2 is disposed on a front side, when the other end face 2f is detected by the tip end detection mechanism 11, a distance in the front and rear direction between the eighth connection terminal 2w and the axial center "CL" when a distance "L" between the reference surface 5a and the axial center "CL" is set not less than 17.87 mm and not more than 19.87 mm is longer than a distance in the front and rear direction between the fourth connection terminal 2s and the axial center "CL" when the distance "L" between the reference surface 5a and the axial center "CL" is set not less than 10.25 mm and not more than 12.25 mm. Therefore, in a case that the distance "L" between the reference surface 5a and the axial center "CL" is set not less than 17.87 mm and not more than 19.87 mm, when a card 2 is inserted in the direction shown by the arrow in FIG. 15(B) and, in addition, the card 2 is inclined so that its other end face 2g side of the card 2 is disposed on a front side, detection of the external connection terminal 2c of the card 2 by the metal detection mechanism 10 can be surely prevented when the other end face 2f is detected by the tip end detection mechanism 11. As a result, it can be further appropriately detected whether a card 2 has been inserted in a correct posture or not.

In the embodiment described above, the metal detection mechanism 10 is disposed so that an axial direction of the axial center "CL" of the core 15 and the upper and lower direction are coincided with each other. However, the present invention is not limited to this embodiment. For example, the metal detection mechanism 10 may be disposed so that the axial center "CL" of the core 15 is inclined with respect to the upper and lower direction when viewed in the right and left direction. In this case, for example, in a case that a normal card 2 is inserted into the insertion port 3 in a correct posture without inclination, the metal detection mechanism 10 is disposed so that, when the one end face 2d is detected by the tip end detection mechanism 11, an extended line of the axial center "CL" passes through the sixth connection terminal 2u (lower end face of the core 15 formed on the extended line of the axial center "CL" faces the sixth connection terminal 2u).

In the embodiment described above, in a case that a normal card 2 is inserted into the insertion port 3 in a correct posture without inclination, the metal detection mechanism 10 is disposed so that, when the one end face 2d is detected by the tip end detection mechanism 11, the axial center "CL" of the core 15 and the sixth connection terminal 2u are overlapped with each other in the upper and lower direction. However, the present invention is not limited to this embodiment. For example, the metal detection mechanism 10 may be disposed so that, in a case that a normal card 2 is inserted into the insertion port 3 in a correct posture without inclination, when the one end face 2*d* is detected by the tip end detection mechanism 11, the fifth connection terminal 2*t*, the seventh connection terminal 2*v* or the eighth connect terminal 2*w* is overlapped with the axial center "CL" of the core 15 in the upper and lower direction.

In the embodiment described above, the metal detection mechanism 10 includes a pair of the excitation coils 16 and 17. However, the metal detection mechanism 10 may include only one excitation coil. Further, in the embodiment described above, the tip end detection mechanism 11 is an optical type sensor. However, the tip end detection mechanism 11 may be a mechanical type sensor such as a micro switch. Further, the tip end detection mechanism 11 may be structured of a lever member, which is capable of contacting with and moved by a card 2, and an optical or mechanical type sensor which detects movement of the lever member. Further, in the embodiment described above, a magnetic stripe is formed on a rear face 2*b* of a card 2 but no magnetic stripe may be formed on a rear face 2*b* of a card 2.

In the embodiment described above, the card reader 1 is a card conveyance type card reader having a card conveying mechanism but the card reader 1 may be a manual type card reader having no card conveying mechanism. For example, the card reader 1 may be a so-called dip-type card reader.

[Third Embodiment]

A third embodiment of the present invention will be described below. A basic structure of a card reader in this embodiment is substantially the same as the card reader 1 shown in FIG. 1 and is provided with similar functions and thus the same reference signs are used in the same structures and their detailed descriptions are omitted. A card same as the second embodiment is used in the third embodiment.

Figure 9:
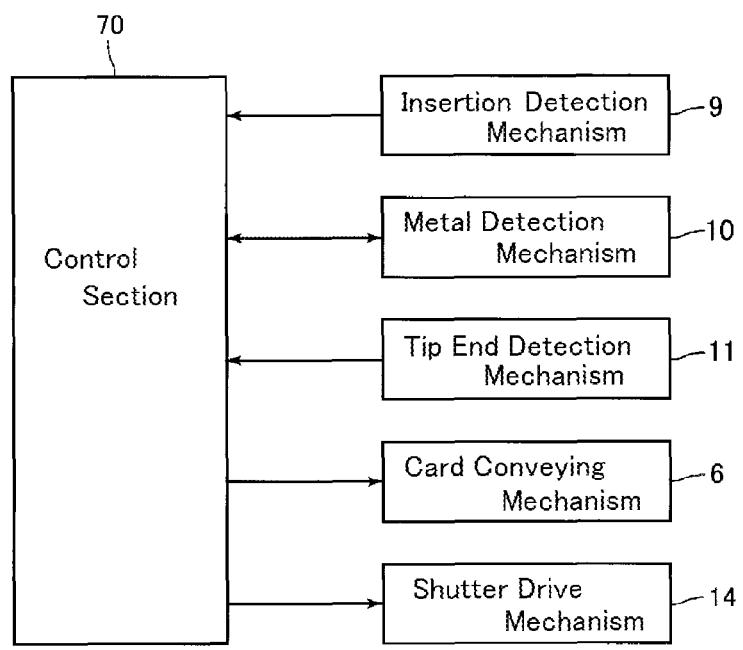
FIG. 9 is a block diagram showing a control section and structures relating to a taking-in operation of a card in accordance with a third embodiment in a card reader shown in FIG. 1.

FIG. 9 is a block diagram showing a control section 70 and structures relating to a taking-in operation of a card 2 in the card reader 1 shown in FIG. 1.

(Structure of Card Insertion Part)

FIGS. 10 through 12(B) are explanatory views showing a schematic structure of the card insertion part 4 shown in FIG. 1 in a third embodiment. As the metal detection mechanism 10 shown in FIG. 10, a magnetic type sensor similar to the metal detection mechanism 10 shown in FIG. 6 may be used.

The card insertion part 4 structures a front face side portion of the card reader 1. The card insertion part 4 includes an insertion detection mechanism 9 structured to detect a card 2 inserted into the insertion port 3, a metal detection mechanism 10 structured to detect an external connection terminal 2*c* of the card 2, a tip end detection mechanism 11 structured to detect a rear end of the card 2 inserted into the insertion port 3 (in other words, a tip end of the card 2 in an inserting direction), a shutter member 13 structured to open and close the card passage 5, and a shutter drive mechanism 14 structured to drive the shutter member 13. The insertion detection mechanism 9, the metal detection mechanism 10, the tip end detection mechanism 11 and the shutter drive mechanism 14 are connected with the control section 70.

A width of the insertion port 3 in the right and left direction is set to be wider than a width in a longitudinal direction of a card 2. A left end of the card passage 5 is formed as a reference surface 5*a* with which a left end face of a card 2 inserted into the insertion port 3 is contacted. The reference surface 5*a* is a conveyance reference surface for a card 2 which is conveyed along the card passage 5. The card insertion part 4 is, for example, disposed with an urging member (not shown) such as a plate spring. A card 2 inserted into the insertion port 3 is urged to a left direction so that a left end face of the card 2 is contacted with the reference surface 5*a* by an urging force of the urging member.

The insertion detection mechanism 9 is, for example, an optical sensor which includes a light emitting element and a light receiving element which receives light from the light emitting element. The insertion detection mechanism 9 is, for example, a transmission type optical sensor. The light emitting element and the light receiving element structuring the insertion detection mechanism 9 are disposed so as to interpose the card passage 5 in the upper and lower direction. When light emitted from the light emitting element to the light receiving element is intercepted by a rear end portion of a card 2 inserted into the insertion port 3, it is detected that a card 2 has been inserted into the insertion port 3.

In accordance with an embodiment of the present invention, the insertion detection mechanism 9 may be a reflection type optical sensor or may be a mechanical type sensor such as a micro switch. Further, the insertion detection mechanism 9 may include a so-called width detection mechanism which is disposed on both sides of the card passage 5 in the right and left direction for detecting both ends in a longitudinal direction of a card 2. The width detection mechanism is, for example, structured of lever members, which are respectively contacted with and moved by both end faces in the right and left direction of the card 2, and optical or mechanical type sensors which detect movement of the lever members.

The tip end detection mechanism 11 is, for example, an optical type sensor which includes a light emitting element and a light receiving element which receives light from the light emitting element.

The metal detection mechanism 10 is disposed on an upper side of the card passage 5. Further, the metal detection mechanism 10 is disposed so that an axial direction of the axial center "CL" of the core 15 and the upper and lower direction are coincided with each other. Further, similarly to the above-mentioned second embodiment, the metal detection mechanism 10 is disposed at a position in the right and left direction where an external connection terminal 2*c* of a normal card 2 inserted into the insertion port 3 in a correct posture is passed. In this embodiment, the metal detection mechanism 10 is disposed so that, when a normal card 2 is inserted into the insertion port 3 in a correct posture without inclination, the fifth through the eighth connection terminals 2*t* through 2*w* pass an extended line of the axial center "CL" of the core 15.

Figure 10:
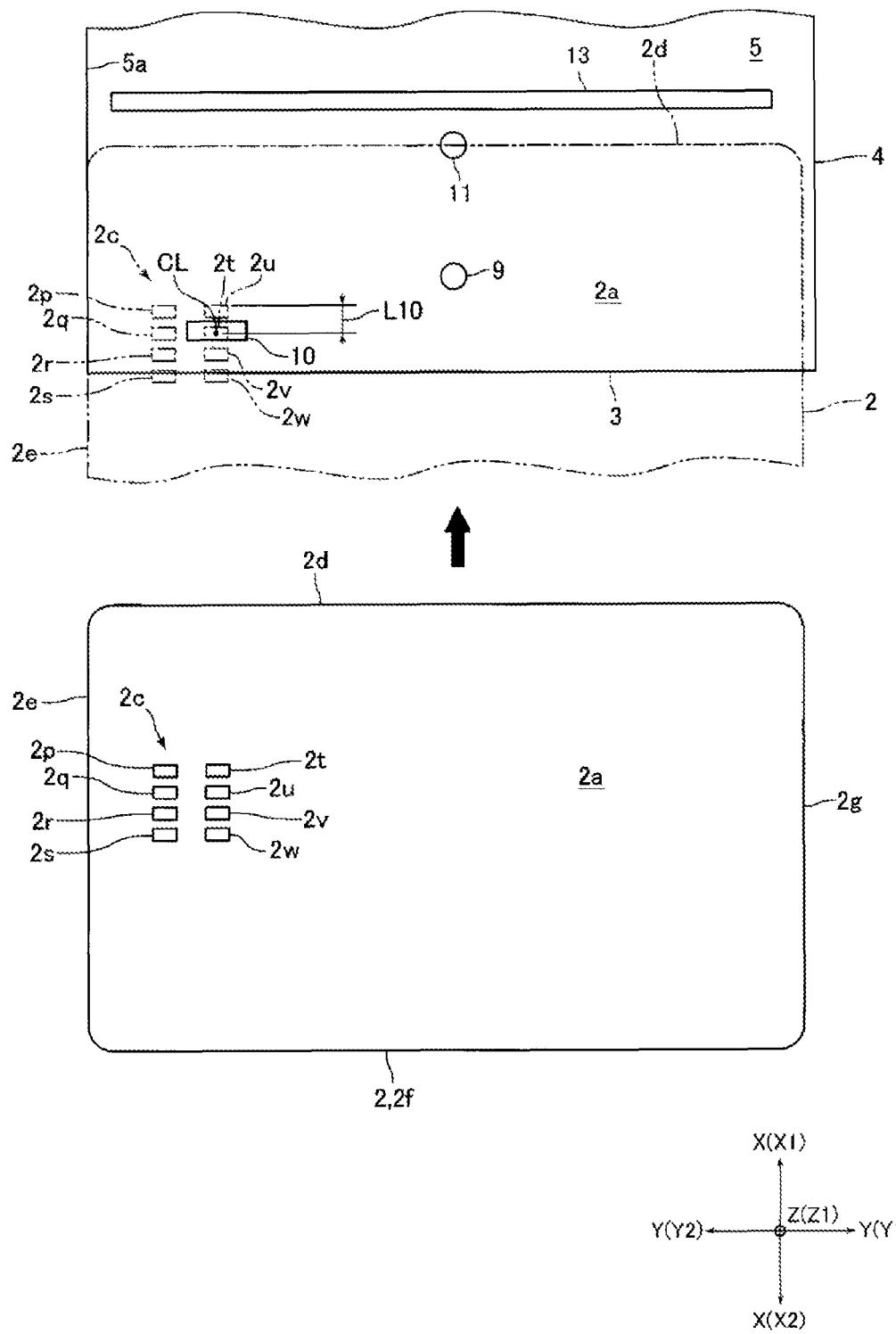
FIG. 10 is an explanatory view showing a schematic structure of a card insertion part shown in FIG. 1 in accordance with a third embodiment.

Further, the metal detection mechanism 10 and the tip end detection mechanism 11 are disposed so that, when a normal card 2 is inserted into the insertion port 3 in a correct posture, the metal detection mechanism 10 detects an external connection terminal 2*c* of the card 2 before the tip end detection mechanism 11 detects its one end face 2*d*. Specifically, as shown in FIG. 10, the metal detection mechanism 10 and the tip end detection mechanism 11 are disposed so that, in a case that a normal card 2 is inserted into the insertion port 3 in a correct posture without inclination, when the card 2 is reached to a detection position where the tip end detection mechanism 11 detects the one end face 2*d*, the axial center "CL" of the core 15 and the sixth connection terminal 2*u* are overlapped with each other in the upper and lower direction.

In this embodiment, in a case that a normal card 2 is inserted into the insertion port 3 in a correct posture without inclination, when the first through the eighth connection terminals 2*p* through 2*w* are formed at the dimension values shown in FIG. 16(B) and the sizes of the first through the eighth connection terminals 2p through 2w are the smallest, a distance "L10" (see FIG. 10) in the front and rear direction between a rear end of the fifth connection terminal 2t and the axial center "CL" of the core 15 when the tip end detection mechanism 11 detects the one end face 2d is 2.92 mm (a rear end of the fifth connection terminal 2t, i.e., a tip end of the external connection terminal 2c has already passed the axial center "CL" of the core 15). In this case, in a case that a normal card 2 is inserted into the insertion port 3 in a correct posture without inclination, when the sizes of the first through the eighth connection terminals 2p through 2w are the smallest, a detection start time for the external connection terminal 2c by the metal detection mechanism 10 becomes the most delayed when the card 2 inserted into the insertion port 3 is moved to a rear side at a constant speed.

Figure 12A:
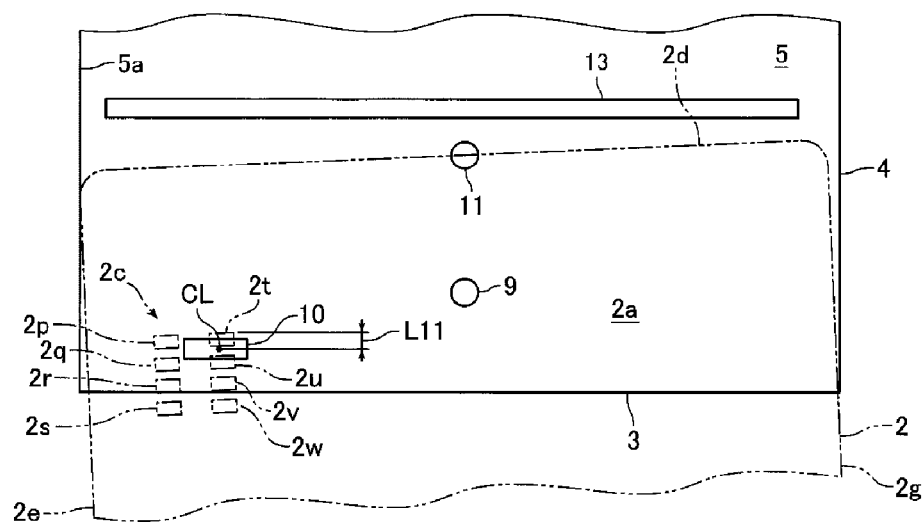
FIGS. 12(A) and 12(B) are explanatory views showing a schematic structure of a card insertion part shown in FIG. 1 in accordance with a third embodiment.
Figure 12B:
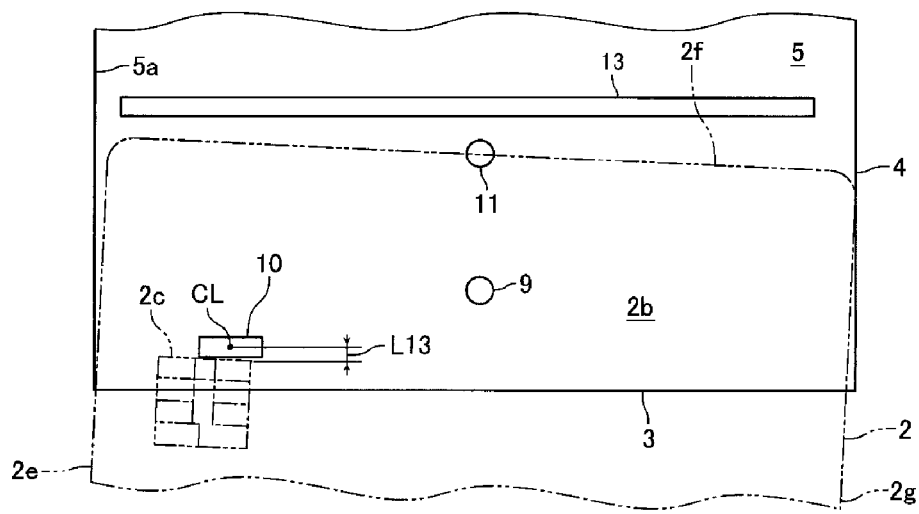
Figure 12B:
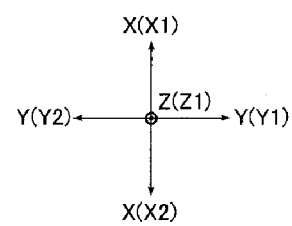

Further, as described above, a width of the insertion port 3 in the right and left direction is set to be wider than a width in a longitudinal direction of a card 2. Therefore, when a normal card 2 is inserted into the insertion port 3 in a correct posture, the card 2 may be inserted into the insertion port 3 in a state that a short widthwise direction of the card 2 is inclined with respect to the front and rear direction. In a case that a card 2 is inclined in a state shown in FIG. 12(A) so that the one end face 2e side of the card 2 is located on a front side (in other words, the card 2 is the most inclined to a front side), when the card 2 inserted into the insertion port 3 is moved to a rear side at a constant speed, a detection start time for the external connection terminal 2c by the metal detection mechanism 10 becomes the latest. In this embodiment, in a case that a normal card 2 is inserted into the insertion port 3 in an inclined state as shown in FIG. 12(A), when the sizes of the first through the eighth connection terminals 2p through 2w becomes the smallest, a distance "L11" in the front and rear direction (see FIG. 12(A)) between a rear end of the fifth connection terminal 2t and the axial center "CL" of the core 15 when the tip end detection mechanism 11 detects the one end face 2d is 1.798 mm (also in this state, a rear end of the fifth connection terminal 2t, i.e., a tip end of the external connection terminal 2c has already passed the axial center "CL" of the core 15).

Figure 11:
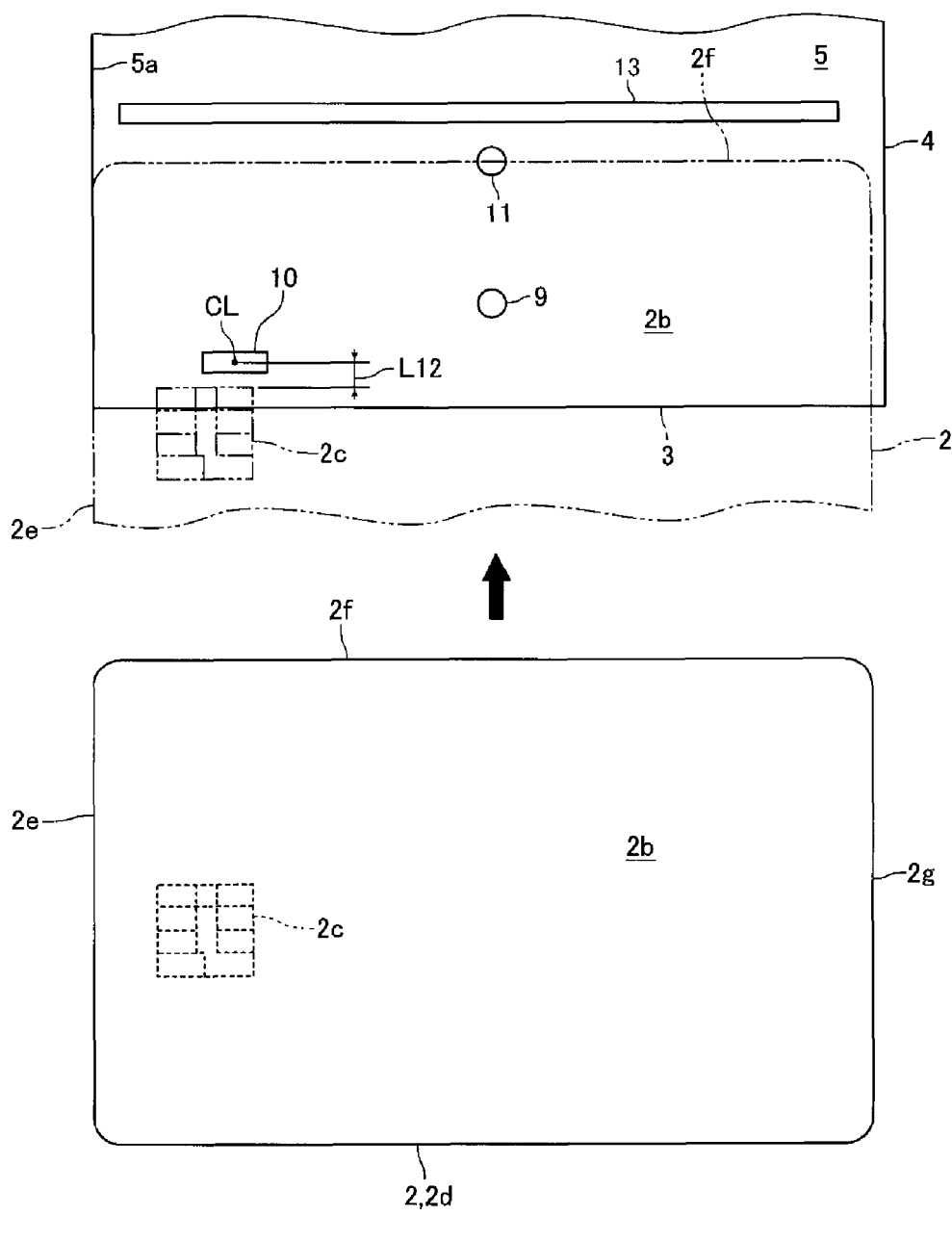
FIG. 11 is an explanatory view showing a schematic structure of a card insertion part shown in FIG. 1 in accordance with a third embodiment.
Figure 11:
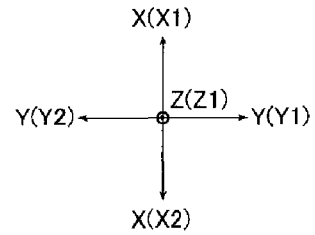

Further, in a case that a normal card 2 commonly available on the market is inserted into the insertion port 3 from the other end face 2f side in a short widthwise direction of the card 2 in a state that its rear face 2b is directed upward, when the tip end detection mechanism 11 detects the other end face 2f, as shown in FIG. 11, the external connection terminal 2c does not reach to a position where the metal detection mechanism 10 is disposed. In this embodiment, in a case that a normal card 2 commonly available on the market is inserted into the insertion port 3 without inclination from the other end face 2f side in a state that its rear face 2b is directed upward, when the tip end detection mechanism 11 detects the other end face 2f, a distance "L12" in the front and rear direction (see FIG. 11) between a rear end of the external connection terminal 2c and the axial center "CL" of the core 15 is 1.97 mm.

Further, in a case that a normal card 2 commonly available on the market is inserted into the insertion port 3 from the other end face 2f side in a state that its rear face 2b is directed upward, there may be a case that the card 2 is inserted into the insertion port 3 in a state that a short widthwise direction of the card 2 is inclined with respect to the front and rear direction. In this case, in a case that a card 2 is inclined in a state shown in FIG. 12(B) so that the other end face 2g side of the card 2 is located on a front side (in other words, the card 2 is the most inclined so that the other end face 2g side of the card 2 is located on a front side), when the card 2 inserted into the insertion port 3 is moved to a rear side at a constant speed, a detection start time for the external connection terminal 2c by the metal detection mechanism 10 becomes the earliest. In this embodiment, in a case that a normal card 2 commonly available on the market is inserted into the insertion port 3 from the other end face 2f side in a state that its rear face 2b is directed upward and, in addition, in a case that the card 2 is inserted into the insertion port 3 in an inclined state shown in FIG. 12(B), a distance "L13" in the front and rear direction (see FIG. 12(B)) between a rear end of the external connection terminal 2c and the axial center "CL" of the core 15 when the tip end detection mechanism 11 detects the other end face 2f is 0.561 mm (even in this state, a tip end of the external connection terminal 2c does not reach to the position of the core 15).

Further, the insertion detection mechanism 9 and the metal detection mechanism 10 are disposed so that, in a case that a normal card 2 is inserted into the insertion port 3 in a correct posture, the insertion detection mechanism 9 detects the card 2 inserted into the insertion port 3 before a rear end of the external connection terminal 2c is reached to the metal detection mechanism 10 (specifically, the axial center "CL" of the core 15).

The shutter member 13 is disposed on a rear side relative to the tip end detection mechanism 11 in the front and rear direction. A shutter drive mechanism 14 is connected with the shutter member 13. The shutter member 13 is movable between a closing position where the shutter member 13 is located on the card passage 5 to close the card passage 5 and an open position where the shutter member 13 is retreated to a lower side with respect to the card passage 5 to open the card passage 5.

(Taking-in Operation for Card)

Figure 13:
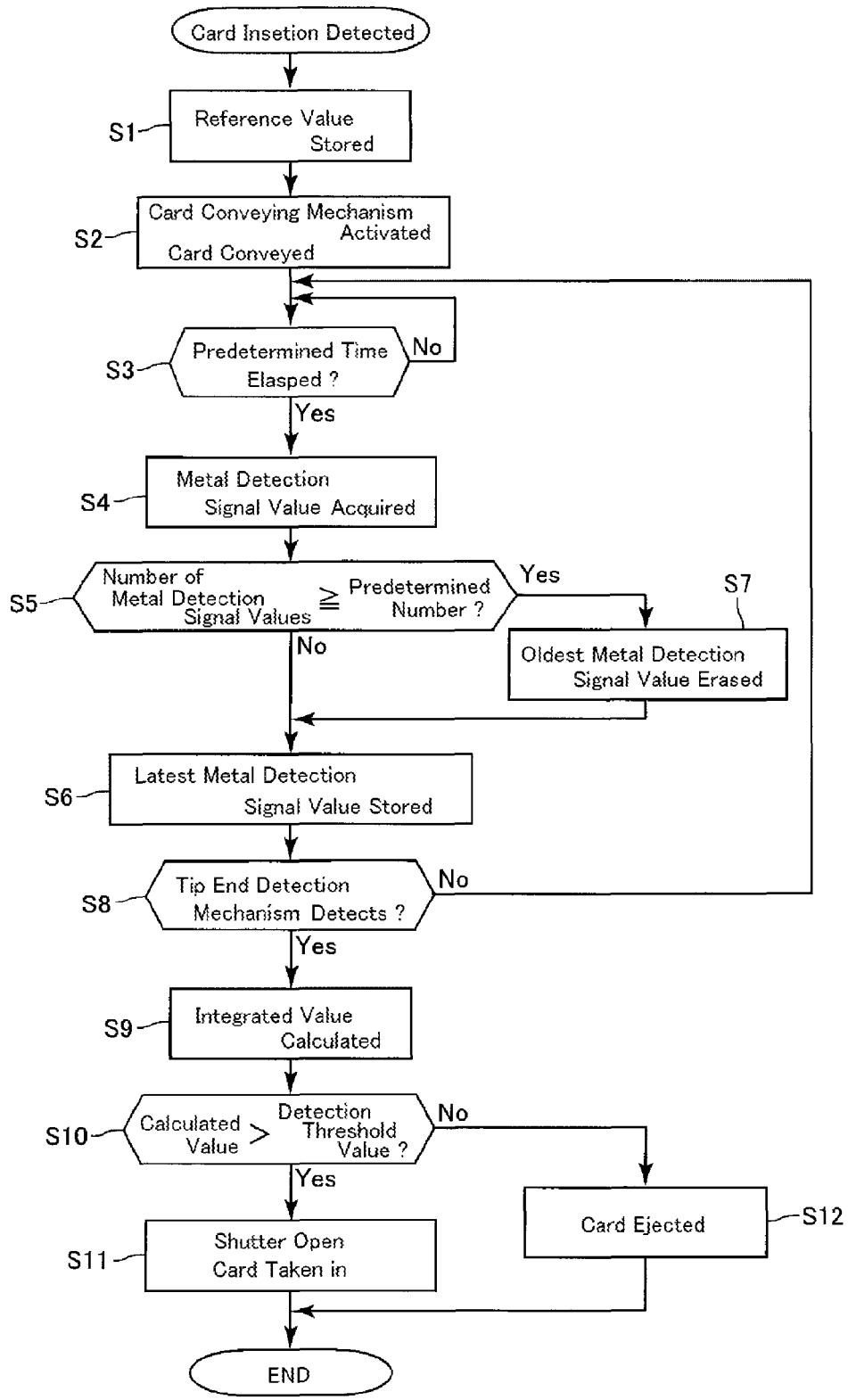
FIG. 13 is a flow chart showing a flow of a taking-in operation for a card in accordance with a third embodiment in a card reader shown in FIG. 1.

FIG. 13 is a flow chart showing a flow of a taking-in operation for a card 2 in the card reader 1 shown in FIG. 1.

In the card reader 1, in a standby state before a card 2 is inserted into the insertion port 3, the shutter member 13 is located at the closing position and the card passage 5 is closed. In the standby state, the card conveying mechanism 6 is stopped. Further, in the standby state, a voltage is applied to the excitation coils 16 and 17. In this state, when it is detected by the insertion detection mechanism 9 that a card 2 is inserted into the insertion port 3, a taking-in operation for the card 2 is started by the card reader 1. In other words, when a card 2 is inserted to a position where the card 2 is detected by the insertion detection mechanism 9, the card 2 is brought into a state that the card 2 is sandwiched by a drive roller and a pad roller structuring the card conveying mechanism 6 and a taking-in operation for the card 2 is started by the card conveying mechanism 6.

When it is detected by the insertion detection mechanism 9 that a card 2 is inserted into the insertion port 3, first, the control section 70 stores at this time a signal level of an output signal of the metal detection mechanism 10 as a reference value (step "S1"). In other words, when the insertion detection mechanism 9 detects that the card 2 is inserted into the insertion port 3, the control section 70 stores the reference value which is a signal level of an output signal of the metal detection mechanism 10 in a state that the metal detection mechanism 10 does not face the external connection terminal 2c. Further, the control section 70 activates the card conveying mechanism 6 to convey the card 2 at a constant speed (step "S2"). In other words, the card conveying mechanism 6 conveys the card 2 at a constant speed when it is detected by the insertion detection mechanism 9 that the card 2 is inserted into the insertion port 3. In this embodiment, the card conveying mechanism 6 conveys the card 2 at 190 mm/sec.

After that, the control section 70 judges whether a predetermined time has elapsed after the reference value is stored in the step "S1" or not (step "S3") and, when the predetermined time has elapsed, the control section 70 acquires a metal detection signal value based on an output signal of the metal detection mechanism 10 (step "S4"). Specifically, the control section 70 acquires a metal detection signal value in the step "S4" which is a difference (i.e., variation amount) between a signal level of an output signal of the metal detection mechanism 10 at this time point and the reference value acquired in the step "S1". In this embodiment, the predetermined time in the step "S3" is 1 millisecond (msec). However, the predetermined time in the step "S3" may be longer than 1 msec or may be shorter than 1 msec.

After that, the control section 70 judges whether the number of the metal sensing signal values stored in the control section 70 is not less than a predetermined number or not (step "S5"). In the step "S5", in a case that the number of the metal detection signal values stored in the control section 70 is less than the predetermined number, the control section 70 stores the latest metal detection signal value acquired in the step "S4" in the control section 70 (step "S6"). On the other hand, in the step "S5", in a case that the number of the metal detection signal values stored in the control section 70 is not less than the predetermined number, the control section 70 erases the oldest metal detection signal value stored in the control section 70 (step "S7") and then, in the step "S6", the latest metal detection signal value acquired in the step "S4" is stored in the control section 70. The operation in which the number of the metal detection signal values is limited to a predetermined number is an operation for limiting a detection time by the metal detection mechanism 10 within a predetermined period. As described above, in a case that a normal card 2 is inserted into the insertion port 3 in a correct posture without inclination, when the tip end detection mechanism 11 detects the one end face 2d, a tip end (rear end) of the external connection terminal 2c has already passed the axial center "CL" of the core 15. On the other hand, in a case that a normal card 2 is inserted into the insertion port 3 from the other end face 2f side in a short widthwise direction of the card 2 in a state that its rear face 2b is directed upward, when the tip end detection mechanism 11 detects the other end face 2f, the external connection terminal 2c is not reached to the position where the metal detection mechanism 10 is disposed. Therefore, in order to clearly detect the difference, the detection time by the metal detection mechanism 10 is limited to a predetermined period. In other words, the time when the tip end detection mechanism 11 detects a rear end (the one end face 2d or the other end face 2f) of a card 2 is determined as a reference time point and a predetermined time period before the reference time point is determined as a detection time. Therefore, old metal sensing signal values are erased which are largely separated from the reference time point when the tip end detection mechanism 11 detects a rear end (the one end face 2d or the other end face 2f) of the card 2. The metal detection signal values within an effective time period determined as the detection time are integrated. In this embodiment, the predetermined number in the step "S5" is 17. However, the predetermined number in the step "S5" may be not more than 16 or may be not less than 18.

After that, the control section 70 judges whether a rear end of the card 2 is detected by the tip end detection mechanism 11 or not (step "S8"). In the step "S8", when a rear end of the card 2 is not detected by the tip end detection mechanism 11, the flow is returned to the step "S3". In the step "S3" after passing through the step "S8", the control section 70 judges whether a predetermined time has elapsed or not after acquiring the metal detection signal value in the previous step "S4" and, when the predetermined time has elapsed, the step "S4" is executed.

Further, in the step "S8", when a rear end of the card 2 is detected by the tip end detection mechanism 11, the control section 70 calculates an integrated value by integrating at least a part of a plurality of the metal detection signal values stored in the control section 70 (step "S9"). In this embodiment, a time period not less than 17 msec has elapsed after it is detected by the insertion detection mechanism 9 that a card 2 is inserted into the insertion port 3 and until a rear end of the card 2 is detected by the tip end detection mechanism 11. Therefore, when a rear end of the card 2 is detected by the tip end detection mechanism 11, seventeen (17) metal detection signal values are stored in the control section 70. Specifically, when a rear end of the card 2 is detected by the tip end detection mechanism 11, seventeen (17) metal detection signal values obtained every 1 msec from 17 msec before the time when the rear end of the card 2 is detected by the tip end detection mechanism 11 are stored in the control section 70. Further, in this embodiment, in the step "S9", the control section 70 integrates twelve (12) metal detection signal values as an integrating range, which is from a metal detection signal value stored 5 msec before the time when the rear end of the card 2 is detected by the tip end detection mechanism 11 to a metal detection signal value stored 17 msec before, and the integrated value is calculated in the integrating range. The reason why the metal detection signal values are not integrated from the reference time point when the tip end detection mechanism 11 detects a rear end of the card 2 to the time of 5 msec before will be described below.

After that, the control section 70 judges whether the integrated value calculated in the step "S9" exceeds a predetermined detection threshold value or not (step "S10"). In the step "S10", when the integrated value exceeds the detection threshold value, the control section 70 judges that a normal card 2 has been inserted into the insertion port 3 in a correct posture and activates the shutter drive mechanism 14 to move the shutter member 13 to an open position, and the control section 70 takes the card 2 into an inside of the card reader 1 (step "S11"). The card 2 having been taken into the inside is performed with reading and recording of magnetic data by a magnetic head and reading and recording of data by an IC contact block.

On the other hand, in the step "S10", in a case that the integrated value does not exceed the detection threshold value, the control section 70 judges that a non-normal card 2 has been inserted into the insertion port 3, or that a normal card 2 has been inserted into the insertion port 3 in an incorrect posture, and thus the control section 70 reversely rotates the card conveying mechanism 6 to eject the card 2 from the insertion port 3 (step "S12").

As described above, in this embodiment, in the steps "S3" through "S8", the control section 70 acquires a metal detection signal value based on an output signal of the metal detection mechanism 10 at a cycle of 1 msec after it is detected by the insertion detection mechanism 9 that the card 2 is inserted into the insertion port 3 until a rear end of the card 2 is detected by the tip end detection mechanism 11. Further, the control section 70 calculates an integrated value by integrating a part of the acquired plural metal detection signal values in the step "S9". In addition, in the step "S10", the control section 70 determines whether a normal card 2 has been inserted into the insertion port 3 in a correct posture or not based on the integrated value calculated in the step "S9".

As described above, in this embodiment, the card conveying mechanism 6 conveys a card 2 at a speed of 190 mm/sec. Further, as described above, the distance "L10" (see FIG. 10) is 2.92 mm and, in a case that a normal card 2 is inserted into the insertion port 3 in a correct posture without inclination, a rear end of an external connection terminal 2c of the card 2 conveyed by the card conveying mechanism 6 is reached to the metal detection mechanism 10 at the time of 15.4 msec (=2.92 mm/(190 mm/sec)) before the time when the one end face 2d of the card 2 is detected by the tip end detection mechanism 11. (Specifically, a rear end of the fifth connection terminal 2t is reached to the axial center "CL" of the core 15 at the time of 15.4 msec before the time when the one end face 2d of the card 2 is detected by the tip end detection mechanism 11.)

Further, as described above, the distance "L11" (see FIG. 12(A)) is 1.798 mm and, in a case that a normal card 2 is inserted into the insertion port 3 in a state shown in FIG. 12(A), a rear end of an external connection terminal 2c of the card 2 conveyed by the card conveying mechanism 6 (specifically, a rear end of the fifth connection terminal 2t) is reached to the metal detection mechanism 10 (specifically, the axial center "CL" of the core 15) at the time of 9.5 msec (=1.798 mm/(190 mm/sec)) before the time when the one end face 2d of the card 2 is detected by the tip end detection mechanism 11.

Further, as described above, the distance "L12" (see FIG. 11) is 1.97 mm and, in a case that a normal card 2 commonly available on the market is inserted into the insertion port 3 from the other end face 2f side in a state that its rear face 2b is directed upward without inclination, a rear end of an external connection terminal 2c of the card 2 conveyed by the card conveying mechanism 6 is reached to the metal detection mechanism 10 (specifically, the axial center "CL" of the core 15) at the time of 10.4 msec (=1.97 mm/(190 mm/sec)) after the time when the other end face 2f of the card 2 is detected by the tip end detection mechanism 11.

Further, as described above, the distance "L13" (see FIG. 12(B)) is 0.561 mm and, in a case that a normal card 2 commonly available on the market is inserted into the insertion port 3 in a state shown in FIG. 12(B), a rear end of an external connection terminal 2c of the card 2 conveyed by the card conveying mechanism 6 is reached to the metal detection mechanism 10 (specifically, the axial center "CL" of the core 15) at the time of 3.0 msec (=0.561 mm/(190 mm/sec)) after the time when the other end face 2f of the card 2 is detected by the tip end detection mechanism 11.

As described above, in this embodiment, in a case that a normal card 2 is inserted into the insertion port 3 in a correct posture, the control section 70 integrates the metal detection signal values having been acquired from the time before a rear end of the external connection terminal 2c is reached to the metal detection mechanism 10 in the step "S9". On the other hand, in a case that a normal card 2 is inserted into the insertion port 3 from the other end face 2f side in a state that its rear face 2b is directed upward, the control section 7 finishes acquisition of a metal detection signal value before a rear end of an external connection terminal 2c is reached to the metal detection mechanism 10.

In this embodiment, in a case that a normal card 2 is inserted into the insertion port 3 in a correct posture and is conveyed by the card conveying mechanism 6, a time period from the time when it is detected by the insertion detection mechanism 9 that the card 2 is inserted into the insertion port 3 and until a predetermined time before a rear end of the external connection terminal 2c is reached to the metal detection mechanism 10 is set to be a first elapsed time and, in a case that a normal card 2 is inserted into the insertion port 3 from the other end face 2f side in a state that its rear face 2b is directed upward and is conveyed by the card conveying mechanism 6, a time period from the time when it is detected by the insertion detection mechanism 9 that the card 2 is inserted into the insertion port 3 and until a predetermined time before a rear end of the external connection terminal 2c is reached to the metal detection mechanism 10 is set to be a second elapsed time. In this case, the control section 70 calculates an integrated value by integrating a plurality of metal detection signal values acquired at least a part of a time period, which is after the first elapsed time has elapsed from the time when it is detected by the insertion detection mechanism 9 that the card 2 is inserted into the insertion port 3 and before the second elapsed time has elapsed from the time when it is detected by the insertion detection mechanism 9 that the card 2 is inserted into the insertion port 3.

When the other end face 2f of a card 2 is detected by the tip end detection mechanism 11, a rear end of its external connection terminal 2c does not reach to the metal detection mechanism 10. However, the present inventors have examined and found that a signal level of an output signal of the metal detection mechanism 10 is varied from the time of 5 msec before that the other end face 2f is detected by the tip end detection mechanism 11. Therefore, in this embodiment, in the step "S9", the control section 70 calculates an integrated value by integrating twelve (12) metal detection signal values as an integrating range, which is from a metal detection signal value stored 5 msec before the time when a rear end of the card 2 is detected by the tip end detection mechanism 11 to a metal detection signal value stored 17 msec before. In other words, a time point when the tip end detection mechanism 11 detects a rear end of a card 2 is determined as a reference time point, and a predetermined time period before the reference time point is set as a detection time and, in the detection time, a range in which the difference especially becomes larger is set as an integrating range and an integrated value is calculated over the integrating range.

Further, in this embodiment, as shown in FIG. 12(A), in a case that a normal card 2 is inserted into the insertion port 3 in a correct posture and, even in a case that a detection start time of an external connection terminal 2c by the metal detection mechanism 10 is the latest, a rear end of the external connection terminal 2c is reached to the metal detection mechanism 10 at the time of 9.5 msec before the time when the one end face 2d is detected by the tip end detection mechanism 11. Therefore, in this embodiment, metal detection signal values acquired after a rear end of the external connection terminal 2c is reached to the metal detection mechanism 10 are also included in the metal detection signal values which are integrated in the step "S9".

(Principal Effects in this Embodiment)

As described above, in the third embodiment, a metal detection signal value based on an output signal of the metal detection mechanism 10 is acquired at a predetermined cycle for a period from the time when it is detected by the insertion detection mechanism 9 that a card 2 is inserted into the insertion port 3 to the time when a rear end of the card 2 is detected by the tip end detection mechanism 11 and an integrated value is calculated by integrating a part of a plurality of the acquired metal detection signal values.

Further, when a case that a normal card 2 is inserted in a correct posture is compared with a case that a normal card 2 is inserted from the other end face 2f side in a state that its rear face 2b is directed upward, signal levels of output signals of the metal detection mechanism 10 are different from each other when the external connection terminal 2c is detected by the metal detection mechanism 10. Therefore, according to this embodiment, a difference can be increased between an integrated value, which is obtained by integrating a part of a plurality of metal detection signal values acquired at a predetermined cycle in a case that a normal card 2 is inserted in a correct posture, and an integrated value which is obtained by integrating a part of a plurality of metal detection signal values acquired at a predetermined cycle in a case that a normal card 2 is inserted from the other end face 2f side in a state that its rear face 2b is directed upward. Accordingly, in this embodiment, based on the integrated value, it can be appropriately determined whether a normal card 2 is inserted into the insertion port 3 in a correct posture or not.

Especially, in this embodiment, in a case that a normal card 2 is inserted into the insertion port 3 in a correct posture, the control section 70 integrates metal detection signal values acquired from a time before a rear end of the external connection terminal 2c is reached to the metal detection mechanism 10 and, in a case that a normal card 2 is inserted into the insertion port 3 from the other end face 2f side in a state that its rear face 2b is directed upward, the control section 70 finishes acquisition of the metal detection signal value before a rear end of the external connection terminal 2c is reached to the metal detection mechanism 10. Therefore, according to this embodiment, a difference can be further increased between an integrated value when a normal card 2 is inserted in a correct posture and an integrated value when a normal card 2 is inserted from the other end face 2f side in a state that its rear face 2b is directed upward and, as a result, based on the integrated value, it can be further appropriately determined whether a normal card 2 is inserted into the insertion port 3 in a correct posture or not.

Further, in this embodiment, in a case that a normal card 2 is inserted into the insertion port 3 in a correct posture, the control section 70 integrates metal detection signal values acquired from a time before a rear end of the external connection terminal 2c is reached to the metal detection mechanism 10 and, in a case that a normal card 2 is inserted into the insertion port 3 from the other end face 2f side in a state that its rear face 2b is directed upward, the control section 70 finishes acquisition of the metal detection signal value before a rear end of the external connection terminal 2c is reached to the metal detection mechanism 10. Therefore, according to this embodiment, even when a difference is small between a signal level of an output signal of the metal detection mechanism 10 when an external connection terminal 2c of a normal low reactive card 2 inserted in a correct posture is detected by the metal detection mechanism 10 and a signal level of an output signal of the metal detection mechanism 10 when an external connection terminal 2c of the card 2, which is a normal card 2 commonly available on the market, inserted from the other end face 2f side in a state that its rear face 2b is directed upward is detected by the metal detection mechanism 10, a difference between the integrated value in a case that a low reactive card 2 is inserted in a correct posture and the integrated value in a case that a card 2 commonly available on the market is inserted from the other end face 2f side in a state that its rear face 2b is directed upward can be made larger. Accordingly, in this embodiment, even when a low reactive card 2 is inserted into the insertion port 3, based on the integrated value, it can be appropriately determined whether a normal card 2 is inserted into the insertion port 3 in a correct posture or not.

In this embodiment, a metal detection signal value is acquired at a predetermined cycle based on an output signal of the metal detection mechanism 10 for an period after it is detected by the insertion detection mechanism 9 that a card 2 is inserted into the insertion port 3 and until a rear end of the card 2 is detected by the tip end detection mechanism 11. Therefore, according to this embodiment, influence of noise detected by the metal detection mechanism 10 before a card 2 is inserted into the insertion port 3 can be eliminated. Accordingly, in this embodiment, accuracy of the calculated integrated value can be enhanced and, as a result, it can be further appropriately determined whether a normal card 2 is inserted into the insertion port 3 in a correct posture or not.

In this embodiment, in the step "S4", the control section 70 acquires a difference between a signal level at this time of an output signal of the metal detection mechanism 10 and a reference value acquired in the step "S1" as a metal detection signal value. Therefore, according to this embodiment, a metal detection signal value in which influence such as variation of external environment, for example, variation of ambient temperature of the card reader 1 is eliminated can be acquired. Accordingly, in this embodiment, accuracy of an acquired metal detection signal value can be enhanced and accuracy of calculated integrated value can be enhanced. As a result, according to this embodiment, it can be further appropriately determined whether a normal card 2 is inserted into the insertion port 3 in a correct posture or not.

(Other Embodiments)

In the third embodiment described above, a metal detection signal value is acquired at a constant cycle (specifically, every 1 msec) until a rear end of the card 2 is detected by the tip end detection mechanism 11 after it is detected by the insertion detection mechanism 9 that a card 2 is inserted into the insertion port 3. However, the present invention is not limited to this embodiment. For example, a metal detection signal value may be acquired at a constant cycle during a part of a time period until a rear end of a card 2 is detected by the tip end detection mechanism 11 after it is detected by the insertion detection mechanism 9 that a card 2 is inserted into the insertion port 3. Further, in the embodiment described above, the metal detection signal values are acquired after it is detected by the insertion detection mechanism 9 that a card 2 is inserted into the insertion port 3. However, the metal detection signal values may be acquired from a time in a standby state before a card 2 is inserted into the insertion port 3.

In the embodiment described above, twelve (12) metal detection signal values are integrated which are from a metal detection signal value stored 5 msec before the time when a rear end of a card 2 is detected by the tip end detection mechanism 11 to a metal detection signal value stored 17 msec before and thereby an integrated value is calculated. However, twelve (12) metal detection signal values which are arbitrarily selected among seventeen (17) metal detection signal values stored in the control section 7 may be integrated and thereby an integrated value is calculated. Further, in the embodiment described above, twelve (12) metal detection signal values among seventeen (17) metal detection signal values stored in the control section 7 are integrated to calculate an integrated value. However, eleven (11) or less metal detection signal values among seventeen (17) metal detection signal values stored in the control section 70 may be integrated to calculate an integrated value and, alternatively, thirteen (13) or more metal detection signal values may be integrated to calculate an integrated value.

In the embodiment described above, in the step "S4", a difference between a signal level of an output signal of the metal detection mechanism 10 at this time and a reference value acquired in the step "S1" is acquired as a metal detection signal value. However, the present invention is not limited to this embodiment. For example, in a case that the card reader 1 is installed in a place where change of external environment is small, a metal detection signal value acquired in the step "S4" may be a signal level of an output signal of the metal detection mechanism 10 at this time.

In the embodiment described above, the insertion detection mechanism 9 and the metal detection mechanism 10 are disposed so that, in a case that a normal card 2 is inserted into the insertion port 3 in a correct posture, the insertion detection mechanism 9 detects the card 2 inserted into the insertion port 3 before a rear end of its external connection terminal 2c is reached to a disposing position of the metal detection mechanism 10. However, the present invention is not limited to this embodiment. For example, the insertion detection mechanism 9 and the metal detection mechanism 10 may be disposed so that, in a case that a normal card 2 is inserted into the insertion port 3 in a correct posture, the insertion detection mechanism 9 detects the card 2 inserted into the insertion port 3 after a rear end of its external connection terminal 2c is reached to a disposing position of the metal detection mechanism 10.

In the embodiment described above, the metal detection mechanism 10 is disposed so that, when a normal card 2 is inserted into the insertion port 3 in a correct posture without inclination, the fifth through the eighth connection terminals 2t through 2w pass the extended line of the axial center "CL" of the core 15. However, the present invention is not limited to this embodiment. For example, the metal detection mechanism 10 may be disposed so that, when a normal card 2 is inserted into the insertion port 3 in a correct posture without inclination, the first through the fourth connection terminals 2p through 2s pass the extended line of the axial center "CL" of the core 15.

In the embodiment described above, the metal detection mechanism 10 is disposed so that an axial direction of the axial center "CL" of the core 15 and the upper and lower direction are coincided with each other. However, the present invention is not limited to this embodiment. For example, the metal detection mechanism 10 may be disposed so that, when viewed in the right and left direction, the axial center "CL" of the core 15 is inclined with respect to the upper and lower direction. Further, the card 2 may be a different shaped card which is in conformity with the international standard "ISO/IEC7816-2" but not in conformity with the international standard "ISO/IEC7810". For example, the card 2 may be a different shaped card which is in conformity with the international standard "ISO/IEC7816-2" but whose corner part where the other end face 2g and the other end face 2f intersect each other is formed in a ¼ circular arc shape having a comparatively large radius of curvature.

In the embodiment described above, the card reader 1 is a card conveyance type card reader having a card conveying mechanism. However, the card reader 1 may be a manual type card reader having no card conveying mechanism. For example, the card reader 1 may be a so-called dip-type card reader.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card incorporated with an IC chip, the card reader comprising:
   an insertion port into which the card is inserted;
   a metal detection mechanism structured to detect an external connection terminal of the IC chip provided in the card; and
   a tip end detection mechanism structured to detect a tip end in an inserting direction of the card inserted into the insertion port;
   wherein the metal detection mechanism and the tip end detection mechanism are disposed so that, when the tip end detection mechanism detects the tip end in the inserting direction of the card inserted into the insertion port in a correct posture, the metal detection mechanism detects the external connection terminal.

2. The card reader according to claim 1, further comprising a control section into which an output signal of the metal detection mechanism and an output signal of the tip end detection mechanism are inputted,
   wherein the control section is structured to determine whether the card has been inserted into the insertion port in a correct posture or not based on the output signal of the metal detection mechanism when the tip end detection mechanism detects the tip end of the card in the inserting direction.

3. The card reader according to claim 1, wherein the card is formed in a substantially rectangular shape and is taken into in a short widthwise direction of the card and is processed.

4. The card reader according to claim 3, further comprising a width detection mechanism structured to detect both end parts of the card in a width direction which is perpendicular to a thickness direction and the inserting direction of the card inserted into the insertion port.

5. The card reader according to claim 4, further comprising a control section into which an output signal of the metal detection mechanism, an output signal of the tip end detection mechanism and an output signal of the width detection mechanism are inputted,
   wherein the width detection mechanism is disposed on an insertion port side relative to the tip end detection mechanism, and
   wherein the control section is structured to determine whether the card has been inserted into the insertion port in a correct posture or not based on a difference between a signal level of an output signal of the metal detection mechanism when the width detection mechanism detects both end parts of the card and a signal level of an output signal of the metal detection mechanism when the tip end detection mechanism detects a tip end of the card in the inserting direction.

6. The card reader according to claim 3, further comprising:
   a card passage where the card inserted into the insertion port is passed, and a shutter member structured to open and close the card passage, wherein the shutter member is disposed on a rear side of the card reader relative to the tip end detection mechanism.

7. The card reader according to claim 1, wherein the metal detection mechanism is a magnetic type sensor, which comprises an excitation coil, a detection coil, and a core which is formed of magnetic material and around which the excitation coil and the detection coil are wound, and the tip end detection mechanism is an optical type sensor which comprises a light emitting element and a light receiving element structured to receive light from the light emitting element.

8. The card reader according to claim 7, wherein a distance in the inserting direction between the magnetic type sensor and the optical type sensor is longer than a distance between a tip end of the card inserted in a correct posture and the external connection terminal and is shorter than a length which is a total sum of the distance between the tip end of the card and the external connection terminal and a length of the external connection terminal in a short widthwise direction of the card.

9. A card reader for use with a card which is incorporated with an IC chip and formed in a substantially rectangular shape, the card being taken into in a short widthwise direction to be performed with data communication, the card reader comprising:

a card insertion part which is formed with an insertion port into which the card is inserted;

a metal detection mechanism which is provided in the card insertion part and is structured to detect an external connection terminal of the IC chip formed on a front face of the card; and a card passage which is formed in the card insertion part for passing the card;

wherein the metal detection mechanism is a magnetic type sensor which comprises a core made of magnetic material and an excitation coil and a detection coil which are wound around the core with an axial center of the core as a winding center; and wherein in a case that a direction perpendicular to a thickness direction and an inserting direction of the card inserted into the insertion port is referred to as a first direction, one end face of the card in a longitudinal direction of the card is referred to as a first card reference end face, and one end face of the card in a short widthwise direction of the card is referred to as a second card reference end face, one end of the card passage in the first direction is formed to be a reference surface where the first card reference end face is contacted when a normal card is inserted into the insertion port in a correct posture without inclination, and wherein a distance in the first direction between the reference surface and the axial center of the core is set to be 10.25mm or more and 12.25mm or less, or set to be 17.87mm or more and 19.87mm or less.

10. The card reader according to claim 9, wherein a width of the insertion port in the first direction is wider than a width in the longitudinal direction of the card, the card insertion part comprises a tip end detection mechanism structured to detect a tip end in the inserting direction of the card inserted into the insertion port, the tip end detection mechanism is disposed on a rear side relative to the metal detection mechanism in the inserting direction, in a case that a normal card is inserted into the insertion port in a correct posture, the external connection terminal is detected by the metal detection mechanism before the second card reference end face disposed on a rear side in the inserting direction is detected by the tip end detection mechanism, and a distance between the reference surface and the axial center of the core in the first direction is set to be 17.87mm or more and 19.87mm or less.

11. The card reader according to claim 10, wherein the card is formed with a first connection terminal, a second connection terminal, a third connect terminal, a fifth connect terminal, a sixth connect terminal and a seventh connect terminal as the external connection terminal, the first connection terminal, the second connection terminal and the third connect terminal are disposed from the second card reference end face in this order in the short widthwise direction of the card and are disposed at same positions as each other in the longitudinal direction of the card, the fifth connection terminal is disposed at the same position as the first connection terminal in the short widthwise direction of the card, the sixth connection terminal is disposed at the same position as the second connection terminal in the short widthwise direction of the card, and the seventh connection terminal is disposed at the same position as the third connection terminal in the short widthwise direction of the card, the fifth connection terminal, the sixth connection terminal and the seventh connect terminal are disposed at the same position as each other in the longitudinal direction of the card and are disposed at separated positions from the first card reference end face relative to the first connection terminal, the second connection terminal and the third connect terminal, and in a case that a normal card is inserted into the insertion port in a correct posture without inclination, when the second card reference end face is detected by the tip end detection mechanism, the axial center of the core and the sixth connection terminal are overlapped with each other in the thickness direction of the card.

12. The card reader according to claim 9, wherein a distance between the tip end detection mechanism and the metal detection mechanism is set in a range which is longer than a distance between a tip end of the card inserted in a correct posture and the external connection terminal and is shorter than a total length of the distance and a length in the short widthwise direction of the external connection terminal.

13. A card reader for use with a card which is incorporated with an IC chip and formed in a substantially rectangular shape, the card being taken into in a short widthwise direction to be performed with data communication, the card reader comprising:

a card insertion part which is formed with an insertion port into which the card is inserted;

a control section structured to control the card reader;

a metal detection mechanism which is provided in the card insertion part and is structured to detect an external connection terminal of the IC chip formed on a front face of the card; and a tip end detection mechanism which is provided in the card insertion part and is structured to detect a tip end of the card in an inserting direction of the card inserted into the insertion port;

wherein the metal detection mechanism is disposed at a position where the external connection terminal of the normal card inserted in a correct posture is passed in a card width direction perpendicular to a thickness direction and the inserting direction of the card inserted into the insertion port;

wherein the metal detection mechanism and the tip end detection mechanism are connected with the control section and are disposed so that, when the normal card is inserted into the insertion port in a correct posture, the metal detection mechanism detects the external connection terminal before the tip end detection mechanism detects the tip end of the card;

wherein in the normal card, a distance between one end face of the card in the short widthwise direction of the card and one end of the external connection terminal in the short widthwise direction of the card is shorter than a distance between the other end face of the card in the short widthwise direction of the card and the other end of the external connection terminal in the short widthwise direction of the card;

wherein the control section acquires a metal detection signal value based on an output signal of the metal detection mechanism at a predetermined cycle over at least a part of a time period until the tip end of the card is detected by the tip end detection mechanism and calculates an integrated value by integrating at least a part of a plurality of acquired metal detection signal values, and thereby the control section determines whether the normal card has been inserted into the insertion port in a correct posture or not based on the integrated value.

14. The card reader according to claim 13, wherein
the card insertion part comprises an insertion detection mechanism structured to detect the card inserted into the insertion port,
the insertion detection mechanism is connected with the control section and is disposed so that, in a case that the normal card is inserted into the insertion port in a correct posture, the insertion detection mechanism detects the card inserted into the insertion port before the one end of the external connection terminal in the short widthwise direction of the card is reached to the metal detection mechanism, and
the control section is structured to acquire the metal detection signal value at the predetermined cycle over at least a part of a time period as a detection time after the card inserted into the insertion port is detected by the insertion detection mechanism and until the tip end of the card is detected by the tip end detection mechanism.

15. The card reader according to claim 14, wherein
the control section is structured to store a signal level of an output signal of the metal detection mechanism when the card inserted into the insertion port is detected by the insertion detection mechanism as a reference value, and
the metal detection signal value is a difference between a signal level of an output signal of the metal detection mechanism acquired at the predetermined cycle and the reference value.

16. The card reader according to claim 14, further comprising a card conveying mechanism structured to convey the card at a constant speed when the card inserted into the insertion port is detected by the insertion detection mechanism, wherein a case that the card is inserted into the insertion port from a side of the one end face in the short widthwise direction of the card so that the external connection terminal passes the metal detection mechanism is a case that the card is inserted into the insertion port in a correct posture, wherein in a case that the normal card is inserted into the insertion port in a correct posture and is conveyed by the card conveying mechanism, a first elapsed time is defined as a time period after the card inserted into the insertion port is detected by the insertion detection mechanism and until a predetermined time before the one end of the external connection terminal in the short widthwise direction of the card is reached to the metal detection mechanism and, in a case that the normal card is inserted into the insertion port from a side of the other end face in the short widthwise direction of the card so that the external connection terminal passes the metal detection mechanism and is conveyed by the card conveying mechanism, a second elapsed time is defined as a time period after the card inserted into the insertion port is detected by the insertion detection mechanism and until a predetermined time before the other end of the external connection terminal in the short widthwise direction of the card is reached to the metal detection mechanism, and wherein the control section is structured to calculate the integrated value by integrating at least a part of a plurality of the metal detection signal values acquired in the detection time, the detection time being at least a part of a time period after the first elapsed time has elapsed from the time when the card inserted into the insertion port is detected by the insertion detection mechanism and until the second elapsed time has elapsed from the time when the card inserted into the insertion port is detected by the insertion detection mechanism.

17. The card reader according to claim 16, wherein a distance between the tip end detection mechanism and the metal detection mechanism is set in a range which is longer than a distance between the tip end of the card inserted in a correct posture and the external connection terminal and is shorter than a total length of the distance and a length in the short widthwise direction of the external connection terminal.

18. The card reader according to claim 17, wherein the detection time is set in a time period with a time point when the tip end detection mechanism detects the tip end of the card as a reference time point so that the detection time starts before the tip end detection mechanism detects the tip end of the card when the normal card is inserted into the insertion port in a correct posture, and that the detection time ends before the external connection terminal is reached to the metal detection mechanism when the normal card is inserted into the insertion port from the side of the other end face in the short widthwise direction of the card so that the external connection terminal passes the metal detection mechanism.

19. A control method for a card reader for use with a card which is incorporated with an IC chip and formed in a substantially rectangular shape, the card reader comprising a card insertion part formed with an insertion port into which the card is inserted in a short widthwise direction,
wherein the card insertion part comprises:

a metal detection mechanism structured to detect an external connection terminal of the IC chip formed on a front face of the card; and a tip end detection mechanism structured to detect a tip end of the card in an inserting direction of the card inserted into the insertion port;

wherein the metal detection mechanism is disposed at a position where the external connection terminal of a normal card inserted in a correct posture is passed in a card width direction perpendicular to a thickness direction and the inserting direction of the card inserted into the insertion port;

wherein the metal detection mechanism and the tip end detection mechanism are disposed so that, when the normal card is inserted into the insertion port in a correct posture, the metal detection mechanism detects the external connection terminal before the tip end detection mechanism detects the tip end of the card; and wherein in the normal card, a distance between one end face of the card in the short widthwise direction of the card and one end of the external connection terminal in the short widthwise direction of the card is shorter than a distance between the other end face of the card in the short widthwise direction of the card and the other end of the external connection terminal in the short widthwise direction of the card;

the control method comprising:

acquiring metal detection signal values based on an output signal of the metal detection mechanism at a predetermined cycle over at least a part of a time period as a detection time until the tip end of the card is detected by the tip end detection mechanism;

calculating an integrated value by integrating at least a part of a plurality of acquired metal detection signal values; and determining whether the normal card has been inserted into the insertion port in a correct posture or not based on the integrated value.

20. The control method for a card reader according to claim 19, wherein the detection time is set in a time period with a time point when the tip end detection mechanism detects the tip end of the card as a reference time point so that the detection time starts before the tip end detection mechanism detects the tip end of the card when the normal card is inserted into the insertion port in a correct posture, and that the detection time ends before the external connection terminal is reached to the metal detection mechanism when the normal card is inserted into the insertion port from the side of the other end face in the short widthwise direction of the card so that the external connection terminal passes the metal detection mechanism.

21. The control method for a card reader according to claim 20, wherein the card reader comprises a card conveying mechanism structured to convey the card, when the insertion detection mechanism detects that the card is inserted into the insertion port, while the card conveying mechanism is activated to convey the card at a constant speed, the metal detection signal value based on the output signal of the metal detection mechanism is acquired at a predetermined cycle until the tip end of the card is detected by the tip end detection mechanism, and the integrated value obtained by integrating the metal detection signal values in the detection time is compared with a predetermined detection threshold value and thereby it is determined whether the normal card has been inserted into the insertion port in a correct posture or not.

\* \* \* \* \*